(12) United States Patent
Chen

(10) Patent No.: US 10,620,478 B2
(45) Date of Patent: Apr. 14, 2020

(54) PHOTOLUMINESCENT DISPLAY DEVICE AND METHOD FOR MANUFACTURING THE SAME

(71) Applicant: MAVEN OPTRONICS CO., LTD., Hsinchu (TW)

(72) Inventor: Chieh Chen, Palo Alto, CA (US)

(73) Assignee: Maven Optronics CO., LTD., Hsinchu County (TW)

( * ) Notice: Subject to any disclaimer, the term of this patent is extended or adjusted under 35 U.S.C. 154(b) by 160 days.

(21) Appl. No.: 15/592,045

(22) Filed: May 10, 2017

(65) Prior Publication Data
US 2017/0343859 A1    Nov. 30, 2017

(30) Foreign Application Priority Data

May 30, 2016 (CN) ........................... 2016 1 0373735
May 30, 2016 (TW) .............................. 105116858 A

(51) Int. Cl.
  *G02F 1/1335* (2006.01)
  *G02B 5/20* (2006.01)
  *G02F 1/13357* (2006.01)

(52) U.S. Cl.
  CPC ....... *G02F 1/133617* (2013.01); *G02B 5/201* (2013.01); *G02F 1/133514* (2013.01);
  (Continued)

(58) Field of Classification Search
  CPC ........ G02B 5/20; G02B 5/201; G02B 6/0073; G02B 26/02; G02F 1/1336; G02F 1/1335;
  (Continued)

(56) References Cited

U.S. PATENT DOCUMENTS 7,667,799 B2  2/2010 Kuo et al.
8,670,089 B2  3/2014 Hung et al.
(Continued)

FOREIGN PATENT DOCUMENTS

CN  104377226 A  2/2015
JP  2013-137931 A  7/2013
(Continued)

OTHER PUBLICATIONS

Englished translation of JP 2014038702, machine translated on Jun. 10, 2019.*
(Continued)

*Primary Examiner* — Jie Lei
(74) *Attorney, Agent, or Firm* — Foley & Lardner LLP

(57) ABSTRACT

A photoluminescent display device includes a blue light source and a photoluminescent display panel adjoining the blue light source. The photoluminescent display panel includes a transparent substrate, a color filter structure and a photoluminescent structure. The color filter structure includes a red pixel region, a green pixel region and a blue pixel region arranged adjacent to one another on the transparent substrate. The photoluminescent structure, which is disposed on the color filter structure and is facing toward the blue light source, includes a red light-conversion layer and a green light-conversion layer, wherein the red light-conversion layer is disposed on the green light-conversion layer. With this vertically stacked arrangement of the light-conversion layers, the photoluminescent display device can have higher optical energy utilization efficiency and a wider viewing angle, while being easier to be manufactured by relaxing the specification of accurate pixel-level alignment among the light-conversion layers and the color filter structure.

14 Claims, 24 Drawing Sheets

(52) U.S. Cl.
CPC ............. *G02F 1/133516* (2013.01); *G02F 2001/133562* (2013.01)

(58) Field of Classification Search
CPC ......... G02F 1/133617; G02F 1/133516; G02F 1/133514; G02F 1/133621; G02F 2001/133616; G02F 2001/133562; F21V 9/16; H01J 1/63; H01J 61/48
USPC .... 359/599, 267, 309, 242, 244; 362/19, 86, 362/84, 351
See application file for complete search history.

(56) References Cited

U.S. PATENT DOCUMENTS

| | | |
|---|---|---|
| 8,947,619 B2 | 2/2015 | Li et al. |
| 2006/0274226 A1 | 12/2006 | Im et al. |
| 2007/0058107 A1 | 3/2007 | Im et al. |
| 2010/0119839 A1 | 5/2010 | Chen |
| 2015/0048348 A1 | 2/2015 | Huang et al. |
| 2015/0277188 A1 | 10/2015 | He |
| 2015/0349285 A1 | 12/2015 | Seo et al. |
| 2016/0070136 A1 | 3/2016 | Jang et al. |

FOREIGN PATENT DOCUMENTS

| | | |
|---|---|---|
| JP | 2014-038702 A | 2/2014 |
| JP | 2015-099633 A | 5/2015 |
| KR | 2007-0029526 A | 3/2007 |
| TW | 200846767 A | 12/2008 |
| TW | 201608714 A | 3/2016 |
| WO | WO-2008/082136 A1 | 7/2008 |
| WO | WO-2009/017794 A1 | 2/2009 |

OTHER PUBLICATIONS

Extended Search Report for corresponding European Patent Application No. 17172158.2, dated Feb. 12, 2018, 16 pages.
Notice of Allowance and Search Report for corresponding Taiwan Application No. 105116858, dated Nov. 23, 2016, 3 pages.
Partial Search Report for corresponding European Patent Application No. 17172158.2, dated Oct. 17, 2017, 14 pages.
Office Action for corresponding Korean Patent Application No. 10-2017-0066182, dated Oct. 6, 2018, 12 pages.
Office Action for corresponding Japanese Patent Application No. 2017-106202, dated Oct. 2, 2018, 6 pages.

* cited by examiner

PHOTOLUMINESCENT DISPLAY DEVICE AND METHOD FOR MANUFACTURING THE SAME

CROSS-REFERENCES TO RELATED APPLICATIONS

This application claims the benefit of and priority to Taiwan Patent Application No. 105116858, and Chinese Patent Application No. 201610373735.8, both filed on May 30, 2016, the disclosures of which are incorporated herein by reference in their entirety.

BACKGROUND

Technical Field

The present disclosure relates to a display device and the manufacturing method thereof, in particular to a photoluminescent display device including a photoluminescent display panel excited by a light source, such as a blue light source.

Description of the Related Art

A liquid crystal display (LCD) device is typically composed of two major components: a liquid crystal panel and a backlight unit. The liquid crystal panel generally includes a thin-film transistor (TFT) circuitry, a liquid crystal cell layer, a polarizer, a pixelated color filter layer and so forth. The backlight unit is specified to generate white light, including red, green and blue spectrum of light, travelling toward and passing through an array of liquid crystal cells, which is then controlled by the TFT circuitry as an on/off light switch. If a liquid crystal cell is turned on at a specific pixel location, the white light corresponding to the specific pixel location can reach the associated color filter pixel so that a specified color, such as red, green, or blue light, is filtered out and remaining light is emitted outwardly as part of a display image. As shown in FIG. 1, a pixelated color filter layer 90 generally includes a red pixel region 91, a green pixel region 92, and a blue pixel region 93, which respectively allow light R having a red spectrum, light G having a green spectrum and light B having a blue spectrum passing through. For example, at the specific location of the red pixel region 91, the light G and the light B will be blocked and absorbed so that the light R having the red spectrum is allowed to selectively pass through. The green pixel region 92 and the blue pixel region 93 have similar color filtering function so that the green light and the blue light can selectively pass through, respectively. Even though this color filtering mechanism is satisfactory for an LCD device, on the other hand, one major drawback of the color filtering mechanism is that when the white light passes through the pixelated color filter layer 90, a majority (e.g., about two-thirds) of the light spectrum is blocked by the pixelated color filter layer 90, causing a significant light energy loss.

Typically, an LCD device uses a small portion of the white light energy generated by a backlight unit of the LCD device to display an image. Generally, 4% to 10% of the white light energy generated from the backlight unit is transmitted out of the LCD device. In other words, the light energy utilization efficiency is low.

Another drawback of an LCD device is that the viewing angle is usually limited, which is caused by the working principle of liquid crystal materials. Various solutions have been developed by the LCD industry to address the drawback of limited viewing angle of the LCD device. For example, Hitachi developed In-Plane Switching (IPS) technology using horizontal electrodes to make liquid crystal molecules rotate in plane so that an on/off light switch is achieved. Fujitsu and Samsung use Multi-Domain Vertical Alignment (MVA) and Pattern Vertical Alignment (PVA) technologies, respectively, where a single pixel is divided into multiple areas (Multi-Domain) to increase the viewing angle. Even though these technologies can alleviate the drawback of the LCD device with limited viewing angle, however, some accompanying issues arise, such as more complicated fabrication process, higher production costs, lower manufacturing yield, lower light transmission rate, and so forth. Moreover, although Fujitsu's Wide Viewing Film (WVF) technology has an acceptable production cost with high process compatibility to the existing LCD device manufacturing line, the improvement in increasing viewing angle is relatively small. Therefore, there is still a need to address the issue of the limited viewing angle in the LCD device.

In order to improve the above-mentioned problems such as low light energy utilization efficiency and the limited viewing angle of LCD devices, photoluminescent display devices using a blue light source as a backlight to excite a photoluminescent panel have been proposed. For example, in a proposed photoluminescent display device, a backlight unit generates a blue light to excite a pixelated photoluminescent structure after passing through a liquid crystal cell, which is sandwiched between the backlight unit and the photoluminescent structure. The pixelated photoluminescent structure includes red pixel regions, green pixel regions and blue pixel regions arranged side by side, wherein the red and green pixel regions are disposed with red and green photoluminescent materials respectively, and the blue pixel regions usually do not contain photoluminescent materials. In this arrangement, the blue light can be converted into a red light while passing through the red pixel region, and can be converted into a green light while passing through the green pixel region of the photoluminescent structure. The blue light is directly displayed without color conversion while passing through the blue pixel region. As a result, the photoluminescent display device can generate the red light, green light and blue light without using a color filter, therefore reducing the light energy loss. The brightness (luminance) of a color image is greatly improved without increasing the electrical energy consumption used to power the backlight unit. In addition, scattering of the converted light by exciting the photoluminescent materials with incident blue light can generally increase the viewing angle as compared to LCD devices.

Furthermore, for a display panel of a portable device, the pixel size is greatly reduced to improve the demanding display image quality. For example, for a smart phone equipped with a five-inch Full High Definition (FHD) display panel, the length and width of a sub-pixel are about 57 µm and about 19 µm, respectively. Thus, a higher accuracy of side-by-side alignment among red and green photoluminescent pixels is specified to fabricate a pixelated photoluminescent structure with such small pixel size. It is quite challenging during a manufacturing process to avoid misalignment of photoluminescent light-conversion layers. For example, a green photoluminescent light-conversion layer may partially cover and then stack up against an adjacent red light-conversion layer due to misalignment during the fabrication process, which results in non-uniform thickness of the pixelated photoluminescent structure and thus poor image quality.

Furthermore, since a red photoluminescent material and a green photoluminescent material generally have different light conversion efficiencies, the thicknesses of the red and green photoluminescent materials specified for the pixelated photoluminescent structure to convert the blue light into red or green light are different.

Therefore, it is needed to improve deficiencies of display devices, such as low light energy utilization efficiency and limited viewing angle, as well as to resolve mass production issues, including misalignment of red and green photoluminescent pixels.

SUMMARY

One object according to some embodiments of the present disclosure is to provide a photoluminescent display device and a manufacturing method thereof, so that the light energy utilization efficiency is improved and/or the viewing angle of the photoluminescent display device is increased, while facilitating the manufacturing process of the photoluminescent display device.

To achieve the aforementioned object, the photoluminescent display device according to some embodiments of the present disclosure includes a photoluminescent display panel and a light source (e.g., a blue light source) adjacent to the photoluminescent display panel, wherein the photoluminescent display panel includes a transparent substrate, a color filter structure and a photoluminescent structure. The color filter structure is disposed on the transparent substrate and comprises a red pixel region, a green pixel region and a blue pixel region arranged adjacent to one another, wherein the red pixel region is specified to selectively allow red light to pass through, the green pixel region is specified to selectively allow green light to pass through, and the blue pixel region is specified to selectively allow blue light to pass through. The photoluminescent structure, which is disposed on the color filter structure and is irradiated by the light source, includes a green light-conversion layer, a red light-conversion layer and a light-transmitting layer, wherein the green light-conversion layer is disposed first covering the red pixel region and the green pixel region of the color filter structure, and the red light-conversion layer is subsequently disposed covering the green light-conversion layer and the red pixel region of the color filter structure.

To achieve the aforementioned object, a manufacturing method of the photoluminescent display device according to some embodiments of the present disclosure includes providing a photoluminescent display panel, and providing a light source (e.g., a blue light source) adjacent to the photoluminescent display panel, wherein providing the photoluminescent display panel includes providing a transparent substrate, forming a color filter structure on the transparent substrate, and forming a photoluminescent structure, which faces toward the light source, on the color filter structure. The color filter structure comprises a red pixel region, a green pixel region and a blue pixel region arranged adjacent to each other, and the photoluminescent structure includes a green light-conversion layer, a red light-conversion layer and a light-transmitting layer. The green light-conversion layer is disposed covering the red pixel region and the green pixel region of the color filter structure and the red light-conversion layer is disposed facing toward the blue light source and covering a portion of the green light-conversion layer directly on the red pixel region of the color filter structure.

Therefore, the photoluminescent display device and the method of manufacturing the same according to some embodiments of the present disclosure can provide at least the following benefits. Because the green light-conversion layer of the photoluminescent structure covers at least the red pixel region and the green pixel region of the color filter structure, the green light-conversion layer has a larger pixel size and thus is easier to align green pixels of the photoluminescent light-conversion layer with the underlying color filter pixels during the fabrication process. In addition, the red photoluminescent light-conversion layer is subsequently disposed on the underlying green light-conversion layer to form a stacked photoluminescent structure, rather than a side-by-side photoluminescent structure. This stacked arrangement allows more tolerance for pixel alignment. Therefore, the red light-conversion layer is also easier to be fabricated. Furthermore, since precise alignment between/among light-conversion layers is not needed, the manufacturing yield loss caused by misalignment, is reduced, therefore lowering production cost.

Further, the photoluminescent display device according to some embodiments of the present disclosure includes the photoluminescent structure with the red light-conversion layer disposed on the green light-conversion layer. This arrangement facilitates the manufacturing process, and also provides improved light energy utilization efficiency. This is because when, for example, a blue light irradiated from the blue light source passes through the red pixel region, it first passes through the red light-conversion layer so that most of the blue light (for example, close to about 100%) is converted into a red light, and then the converted red light continues passing through the green light-conversion layer. Since the red light having a lower energy level will not excite the green photoluminescent material, the red light still keeps the same red spectrum and will not be converted into green light before it reaches the red pixel region of the color filter structure. Since the majority of the light is already in the red spectrum, the light energy will not be absorbed while passing through the red color filter at the location of the red pixel. Light energy utilization efficiency of the photoluminescent display device is therefore improved.

By contrast, for a comparison LCD device, white light is transmitted to pass through red, green and blue pixel regions of a color filter layer to generate corresponding red, green and blue pixels for color images. A majority of the light energy is filtered out while the white light passes through the color filter, resulting in low light energy utilization efficiency. As for the photoluminescent display device disclosed in some embodiments of the present disclosure, the blue light emitted from the blue backlight source thereof can be converted into the red light, the green light and the un-converted blue light respectively while passing through the pixelated photoluminescent structure and can pass through the corresponding red pixel region, green pixel region and blue pixel region of the color filter structure. Thus almost all of the red light, the green light and the blue light can respectively pass through the red pixel region, the green pixel region and the blue pixel region of the color filter structure without considerable absorption by the color filter structure. As a result, the photoluminescent display device has better overall light energy utilization efficiency, therefore improving the brightness (luminance) of the display device with less power consumption.

Furthermore, the converted red light, the converted green light and the un-converted blue light are scattered while the incident blue light is travelling through the pixelated photoluminescent structure, thus exhibiting an approximately Lambertian radiation pattern by excitation of the photoluminescent materials. Thus display images composed of the red light pixels, the green light pixels and the blue light pixels have a larger viewing angle using the photoluminescent display device according to some embodiments of the present disclosure.

Other aspects and embodiments of the disclosure are also contemplated. The foregoing summary and the following detailed description are not meant to restrict the disclosure to any particular embodiment but are merely meant to describe some embodiments of the disclosure.

DETAILED DESCRIPTION

Definitions

Figure 1:
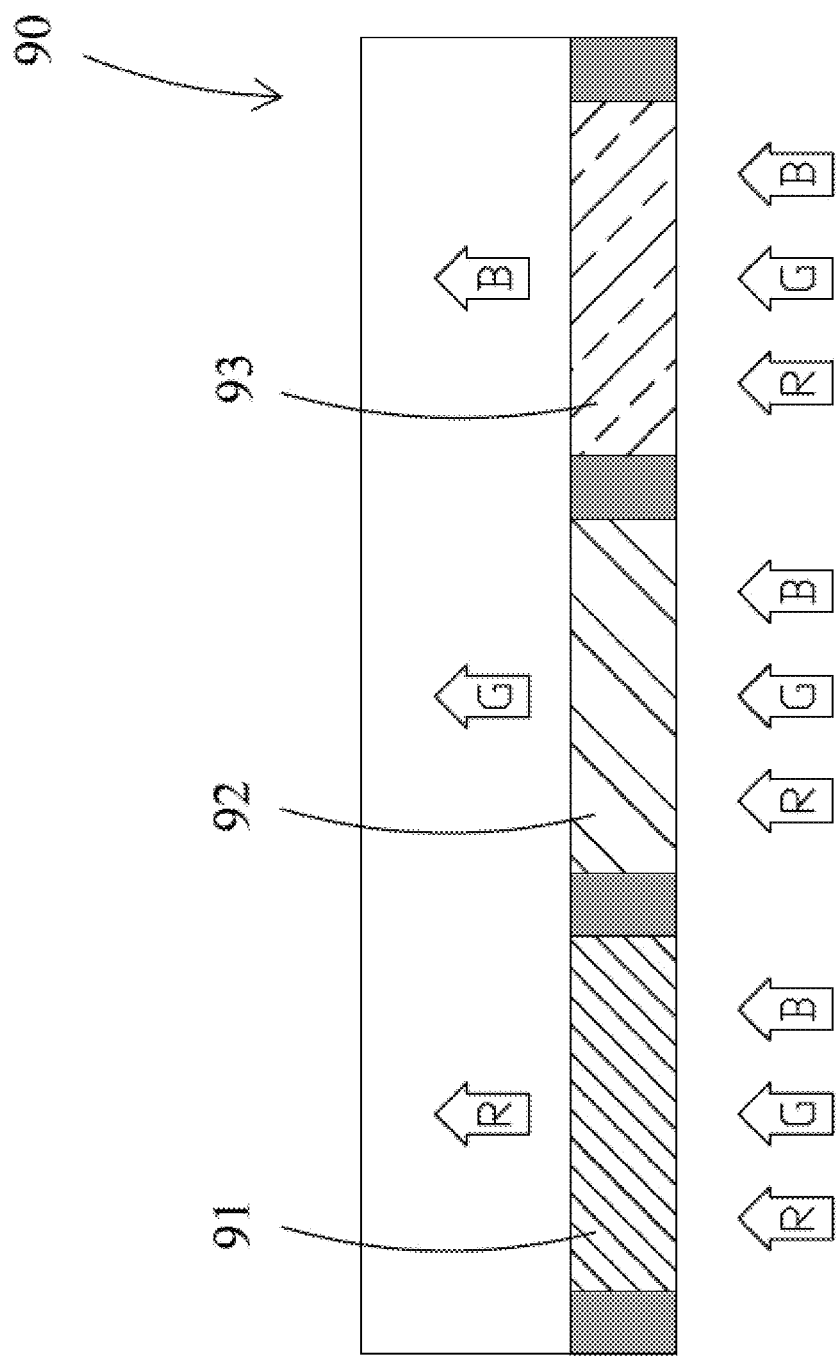
FIG. 1 is a schematic drawing in a cross-sectional view of a pixelated color filter layer.

The following definitions apply to some of the technical aspects described with respect to some embodiments of the disclosure. These definitions may likewise be expanded upon herein.

As used herein, the singular terms "a," "an," and "the" include plural referents unless the context clearly dictates otherwise. Thus, for example, reference to a layer can include multiple layers unless the context clearly dictates otherwise.

As used herein, the term "set" refers to a collection of one or more components. Thus, for example, a set of layers can include a single layer or multiple layers. Components of a set also can be referred to as members of the set. Components of a set can be the same or different. In some instances, components of a set can share one or more common characteristics.

As used herein, the term "adjacent" refers to being near or adjoining. Adjacent components can be spaced apart from one another or can be in actual or direct contact with one another. In some instances, adjacent components can be connected to one another or can be formed integrally with one another. In the description of some embodiments, a component provided "on" or "on top of" another component can encompass cases where the former component is directly on (e.g., in direct physical contact with) the latter component, as well as cases where one or more intervening components are located between the former component and the latter component. In the description of some embodiments, a component provided "underneath" another component can encompass cases where the former component is directly beneath (e.g., in direct physical contact with) the latter component, as well as cases where one or more intervening components are located between the former component and the latter component.

As used herein, the terms "connect," "connected," and "connection" refer to an operational coupling or linking. Connected components can be directly coupled to one another or can be indirectly coupled to one another, such as via another set of components.

As used herein, the terms "about", "substantially", and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels of the manufacturing operations described herein. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein with respect to photoluminescence, the term "efficiency" or "quantum efficiency" refers to a ratio of the number of output photons to the number of input photons.

As used herein, the term "size" refers to a characteristic dimension. In the case of an object (e.g., a particle) that is spherical, a size of the object can refer to a diameter of the object. In the case of an object that is non-spherical, a size of the object can refer to an average of various orthogonal dimensions of the object. Thus, for example, a size of an object that is a spheroidal can refer to an average of a major axis and a minor axis of the object. When referring to a set of objects as having a particular size, it is contemplated that the objects can have a distribution of sizes around that size. Thus, as used herein, a size of a set of objects can refer to a typical size of a distribution of sizes, such as an average size, a median size, or a peak size.

Figure 2A:
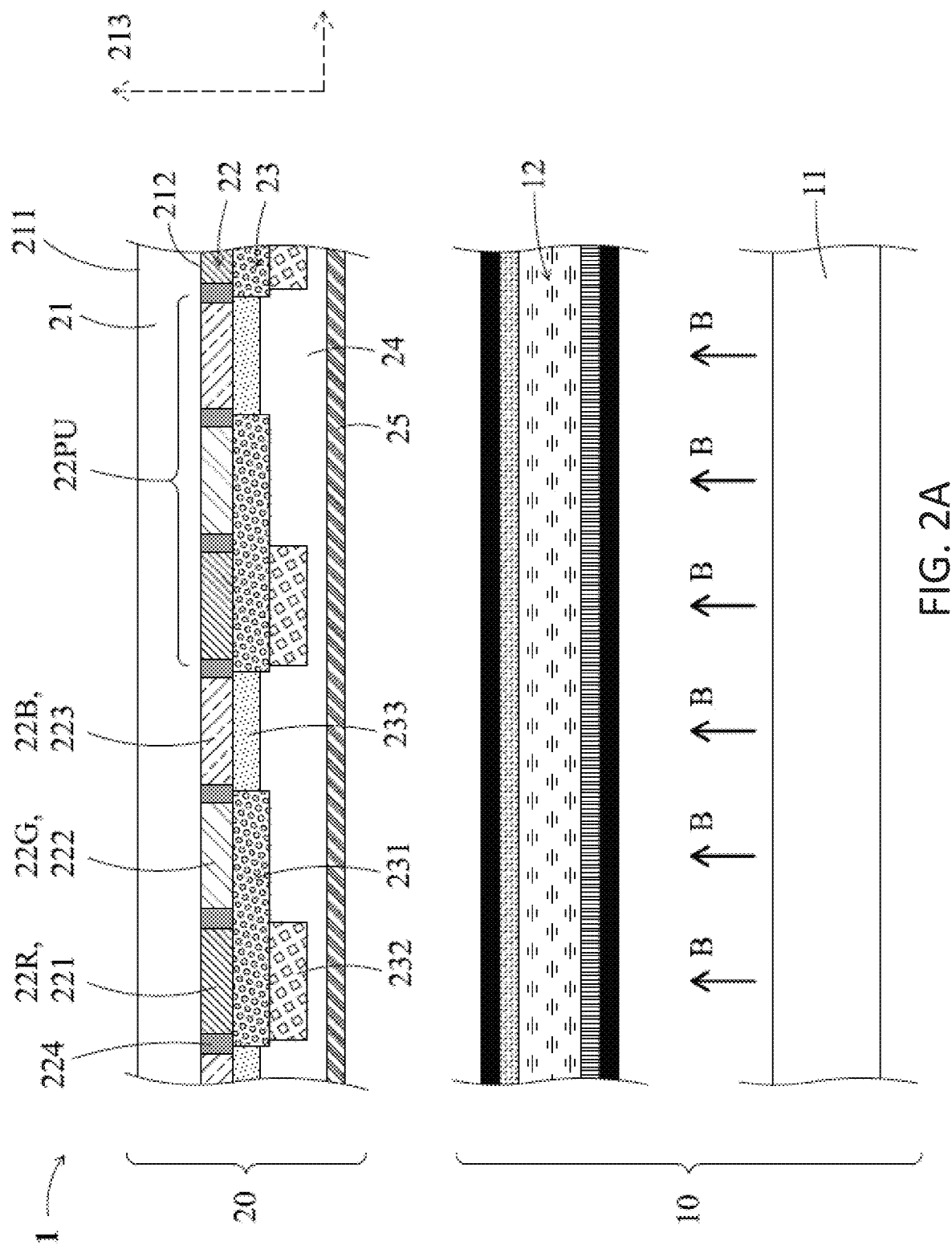
FIG. 2A is a schematic drawing in a cross-sectional view illustrating a photoluminescent display device according to one embodiment of the present disclosure.

FIG. 2A shows a schematic drawing in a cross-sectional view of a photoluminescent (PL) display device 1 according to one embodiment of the present disclosure. The photoluminescent display device 1, or PL display device 1, has red, green, and blue color pixels generated respectively through red, green, and blue light to display color images. The PL display device 1 comprises a blue light source 10 and a photoluminescent display panel 20. The photoluminescent display panel 20 is disposed adjacent to the blue light source 10 and, for example, facing toward blue incident light from the blue light source 10. The photoluminescent display panel 20 may contact the blue incident light source 10, or may be spaced apart from the blue light source 10. The detailed technical contents of the blue light source 10 and the photoluminescent display panel 20 are explained as follows.

The blue light source 10 is specified to generate a blue light B irradiated toward a certain pixelated area on the photoluminescent display panel 20 in a controlled manner. Specifically, the photoluminescent display panel 20 includes a plurality of pixels, and the blue light source 10 can irradiate the blue light B to one designated pixel, to certain designated pixels, or to all pixels. The peak wavelength of the blue light B desirably ranges from about 420 nm to about 480 nm.

The blue light source 10 comprises a backlight unit 11 and a liquid crystal module 12. The backlight unit 11 includes a plurality of sets of a blue light emitting diode (LEDs, not illustrated) arranged in an array, desirably with its beam angle shaped by a secondary optical lens. The sets of the blue LEDs are arranged in a manner to generate uniformly distributed blue light B and to form a direct Back-lit LED backlight unit. Another embodiment of the backlight unit 11 includes a light guide plate irradiated with a plurality of blue LEDs from the edge of the light guide plate so that the light guide plate can generate uniformly distributed blue light B. This arrangement forms an Edge-lit LED backlight unit. The liquid crystal module 12 is disposed adjacent to the backlight unit 11 so that the blue light B irradiates uniformly toward the liquid crystal module 12. The liquid crystal module 12 may include a layer of liquid crystal cells, a transparent electrode layer, a thin film transistor (TFT) circuitry, a polarizer, and so forth. By applying an electric field controlled by the TFT circuitry to desired liquid crystal cells, the corresponding liquid crystal molecules can be twisted so that the blue light B can be selectively controlled to pass through the corresponding cells of the liquid crystal module 12. In other words, the blue light B generated by the backlight unit 11 can selectively pass through the liquid crystal module 12 by controlling the TFT circuitry so that a portion of the blue light B travels to desired pixels on the photoluminescent display panel 20.

Figure 2B:
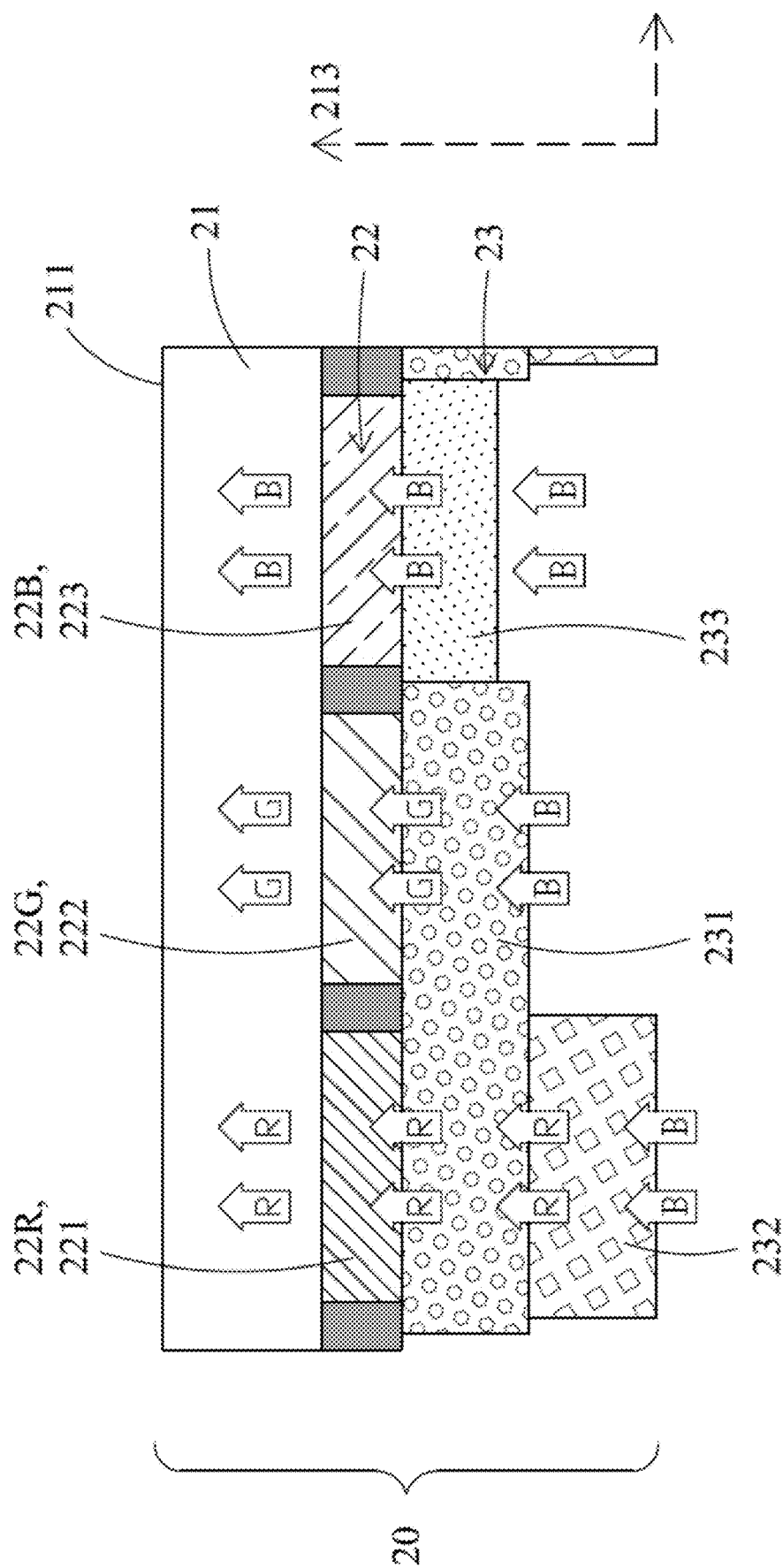
FIG. 2B is a schematic drawing illustrating a color conversion mechanism of the photoluminescent display device shown in FIG. 2A with blue incident light passing through a photoluminescent display panel.

Referring to FIG. 2B, when the blue light B irradiates toward the photoluminescent display panel 20, some blue light B is converted into a red light R by red photoluminescent materials of a photoluminescent structure 23 on a red pixel region 22R of a color filter structure 22, and some blue light B is converted into a green light G by green photoluminescent materials of the photoluminescent structure 23 on a green pixel region 22G of the color filter structure 22. Some blue light B remains unconverted while passing through a light-transmitting material of the photoluminescent structure 23 on a blue pixel region 22B of the color filter structure 22.

Referring to FIG. 2A, the photoluminescent display panel 20 comprises a transparent substrate 21, the color filter structure 22 and the photoluminescent structure 23. The transparent substrate 21 may be a rigid or a flexible substrate made of a substantially optically transparent material in the visible light spectrum, such as glass, plastic (e.g. a polyester such as polyethylene naphthalate (PEN)), and so forth. The transparent substrate 21 may include a flat surface or a curved surface to display color images, such as a curved panel or a flexible substrate used to fabricate curved television sets. The transparent substrate 21 is to provide a supporting substrate for the color filter structure 22 and the photoluminescent structure 23. Specifically, both the color filter structure 22 and the photoluminescent structure 23 are disposed on the transparent substrate 21, and are not detached from the transparent substrate 21. According to one embodiment illustrated in FIG. 2A, the color filter structure 22 is disposed to adjoin the transparent substrate 21 directly, and in other embodiments (not illustrated), the photoluminescent structure 23 is disposed to adjoin the transparent substrate 21 directly.

In addition, the transparent substrate 21 includes a light-emitting surface 211, a light-receiving surface 212, with a normal direction 213 specified to be perpendicular to both of the light-emitting surface 211 and the light-receiving surface 212. If a curved transparent substrate 21 is used, the normal direction 213 at a specific pixel location is defined to be the direction locally perpendicular to both of the curved light-emitting surface 211 and the curved light-receiving surface 212. The light-emitting surface 211 is specified as a surface for light irradiating outward from the transparent substrate 21, and the light-receiving surface 212 is specified as a surface for light entering the transparent substrate 21. The light-receiving surface 212 is arranged facing toward the blue light source 10. The normal direction 213 represents the light traveling direction.

The color filter structure 22 is disposed on the light-receiving surface 212 of the transparent substrate 21 and may include a plurality of Pixel Units 22PU (two of such repeating Pixel Units are shown in FIG. 2A). Each pixel unit 22PU comprises the red pixel region 22R, the green pixel region 22G and the blue pixel region 22B, which are arranged side-by-side and adjacent to one another so that adjacent side edges of the red pixel region 22R, the green pixel region 22G and the blue pixel region 22B may be connected.

For the color filter structure 22, the red pixel region 22R is specified to selectively allow the red light R to pass through, the green pixel region 22G is specified to selectively allow the green light G to pass through, and the blue pixel region 22B is specified to selectively allow the blue light B to pass through. Thus, for example, the green light G and the blue light B will be blocked and absorbed by the red pixel region 22R. The red pixel region 22R includes a red color filter 221, the green pixel region 22G includes a green color filter 222, and the blue pixel region 22B includes a blue color filter 223. Each of the color filters 221, 222 and 223 may be made of materials such as pigments, dyes and so forth, so as to selectively allow the light having the corresponding color or wavelength to pass through and absorb light energy at other spectra.

The red pixel region 22R, the green pixel region 22G, and the blue pixel region 22B may include black matrix layers 224 disposed in between. The black matrix layer 224 is made of opaque materials such as black resin, metal and so forth, so that the red light R, the green light G and the blue light B will be absorbed. The black matrix layer 224 may be of a frame surrounding the color filters 221, 222 and 223.

The photoluminescent structure 23 is disposed on the color filter structure 22 facing toward the blue light source 10 so that the photoluminescent structure 23 is spatially closer to the blue light source 10 than the color filter structure 22. In other words, the photoluminescent structure 23, the color filter structure 22 and the transparent substrate 21 are stacked up sequentially, wherein the transparent substrate 21 is the furthest away from the blue light source 10, and the photoluminescent structure 23 is disposed between the color filter structure 22 and the blue light source 10. In other embodiments (not illustrated), the photoluminescent structure 23 is disposed on the light-emitting surface 211 of the transparent substrate 21, and the color filter structure 22 is sequentially disposed on the photoluminescent structure 23. Therefore, in this arrangement, the color filter structure 22 is the furthest away from the blue light source 10.

The photoluminescent structure 23 includes a first light-conversion layer 231, a second light-conversion layer 232 and a light-transmitting layer 233. The first light-conversion layer 231 is disposed on the color filter structure 22 covering both the red pixel region 22R and the green pixel region 22G of the color filter structure 22, but not covering or exposing the blue pixel region 22B. In other words, when a display image of the photoluminescent display device 1 is projected onto a plane perpendicular along the normal direction 213, projected areas of the red pixel region 22R and the green pixel region 22G of the color filter structure 22 are inside a projected area of the first light-conversion layer 231, but a projected area of the blue pixel region 22B of the color filter structure 22 is outside the projected area of the first light-conversion layer 231.

The second light-conversion layer 232 of the photoluminescent structure 23 is disposed on the first light-conversion layer 231 so that it is spatially closer to the blue light source 10 than the first light-conversion layer 231. The second light-conversion layer 232 covers the red pixel region 22R along the normal direction 213, but does not cover or exposes the green pixel region 22G and the blue pixel region 22B of the color filter structure 22. In other words, when a display image of the photoluminescent display device 1 is projected onto a plane perpendicular along the normal direction 213, the projected area of the red pixel region 22R is inside a projected area of the second light-conversion layer 232, but the projected areas of the green pixel region 22G and the blue pixel region 22B are outside the projected area of the second light-conversion layer 232.

The light-transmitting layer 233 is disposed on the color filter structure 22, is arranged side-by-side and adjacent to the first light-conversion layer 231, and desirably is connected with the first light-conversion layer 231. Desirably, the light-transmitting layer 233 covers the blue pixel region 22B, but does not cover or exposes the green pixel region 22G and the red pixel region 22R. With this embodiment illustrated in FIG. 2A, the red pixel region 22R of the color filter structure 22 is covered by both of the first light-conversion layer 231 and the second light-conversion layer 232; the green pixel region 22G is solely covered by the first light-conversion layer 231, and the blue pixel region 22B is solely covered by the light-transmitting layer 233.

The first light-conversion layer 231 includes one or more green photoluminescent materials, such as β-SiAlON, $SrGa_2S_4$, silicate-type phosphor, green quantum dots and so forth, to generate the green light G while excited by the blue light B. The second light-conversion layer 232 includes one or more red photoluminescent materials, such as $K_2SiF_6$, $(Ca_{1-x}Sr_x)AlSiN_3$, red quantum dots and so forth, to generate the red light R while excited by the blue light B. The first light-conversion layer 231 and the second light-conversion layer 232 may further include a binder material, such as selected from substantially transparent polymer materials including silicone, rubber, epoxy and so forth, to form the photoluminescent structure 23. Furthermore, the green photoluminescent material and the red photoluminescent material may be inorganic photoluminescent materials, organic photoluminescent materials or the like.

The light-transmitting layer 233 is specified to allow light passing through without converting its wavelength. Thus the light-transmitting layer 233 usually does not include any photoluminescent material or does not include any significant amount of a photoluminescent material. Desirably, the light-transmitting layer 233 comprises light scattering particles, such as $TiO_2$, BN, $SiO_2$, $Al_2O_3$ and so forth. In addition, while forming the light-transmitting layer 233, a small amount of the light-transmitting layer 233 may cover the first light-conversion layer 231 and/or the second light-conversion layer 232 (not illustrated) so that the fabrication process is simplified with more alignment tolerance. Since the light-transmitting layer 233 does not include a photoluminescent material, the light-transmitting layer 233 will not affect the functions of the first light-conversion layer 231 and the second light-conversion layer 232 when they are covered with a small amount of the light-transmitting layer 233.

As shown in FIG. 2B, a color conversion mechanism of the blue light B passing through the photoluminescent display panel 20 is illustrated as follows. For the purpose of illustration, the blue light B irradiated from the blue light source 10 can be divided into three portions travelling toward the red pixel region 22R, the green pixel region 22G and the blue pixel region 22B, respectively.

The portion of the blue light B irradiating toward the green pixel region 22G firstly passes through the first light-conversion layer 231, which has a relatively large amount of the green photoluminescent material(s) so that most of the blue light B (for example, close to about 100%) can be converted into a scattered green light G. Most of the green light G can then pass through the green pixel region 22G of the color filter structure 22 and irradiates outwardly from the light-emitting surface 211 of the transparent substrate 21. A small portion of the green light G may be scattered toward the adjacent red pixel region 22R or blue pixel region 22B, but will be blocked and absorbed by the red color filter 221 or the blue color filter 223.

The portion of the blue light B irradiating toward the red pixel region 22R firstly passes through the second light-conversion layer 232. The second light-conversion layer 232 has a relatively large amount of the red photoluminescent material(s) so that most of the blue light B (for example, close to about 100%) can be converted into a scattered red light R. The converted red light R continues passing through the first light-conversion layer 231, the red pixel region 22R, and finally escaping outwardly from the light-emitting surface 211 of the transparent substrate 21. It will be appreciated that when the red light R passes through the first light-conversion layer 231, the red light R will not be converted into the green light G by the green photoluminescent material because the red light R has a lower energy level than a green light. Thus it will not excite the green photoluminescent material. Therefore, the red light R passing through the red pixel region 22R still substantially possesses the red light spectrum so that the light energy will not be absorbed considerably by the red color filter 221.

The portion of the blue light B irradiating toward the blue pixel region 22B firstly passes through the light-transmitting layer 233. Without including any photoluminescent material, the light-transmitting layer 233 does not convert the blue light B into the green light G or the red light R. Desirably, light scattering particles are included so that the blue light B is scattered while passing through the light-transmitting layer 233. Because the light-transmitting layer 233 does not change the spectrum of the incident blue light B, most of the blue light B will not be blocked by the blue pixel region 22B so that it finally irradiates outwardly from the light-emitting surface 211 of the transparent substrate 21.

In summary, while the blue light B generated by the blue backlight source 10 passes through the photoluminescent structure 23, one portion of the blue light B is converted into the red light R, another portion is converted into the green light G, and another portion remains un-converted as the blue light B. Therefore, while the red light R, the green light G and the blue light B continue passing through the corresponding red pixel region 22R, the corresponding green pixel region 22G and the corresponding blue pixel region 22B, they will not be blocked and absorbed by the color filter structure 22 to avoid causing a considerable light energy loss.

In other words, because most of the blue light B (input incident light) irradiated from the blue light source 10 can be converted into the red light R, the green light G and the blue light B by the photoluminescent display panel 20 to form a display image (output display light), the PL display device 1 has an improved light energy utilization efficiency, namely, the ratio of the energy of the output display light to the energy of the input incident light is significantly higher, such as about 20% or greater, about 30% or greater, about 40% or greater, or about 50% or greater.

In addition to the advantage of higher light energy utilization efficiency, another advantage is that the red light R, the green light G and the blue light B are scattered while the light is travelling through the photoluminescent display panel 20. The scattered light will exhibit approximately a Lambertian radiation pattern. The red light R, the green light G and the blue light B will irradiate out of the photoluminescent display panel 20 with a larger beam angle. Thus, color images composed of the red light R, the green light G and the blue light B emitted from the PL display device 1 according to the illustrated embodiment of the present disclosure have a large viewing angle.

Furthermore, since the first light-conversion layer 231 covers both the red pixel region 22R and the green pixel region 22G of the color filter structure 22, the first light-conversion layer 231 is specified to have a larger pixel size, which will be easier to be fabricated. Moreover, since the second light-conversion layer 232 is disposed stacked up vertically rather than arranged side-by-side relative to the first light-conversion layer 231, the allowable pixel alignment tolerances for the second light-conversion layer 232 relative to the first light-conversion layer 231 is much larger. Therefore, a high precision alignment process between the first light-conversion layer 231 and the second light-conversion layer 232 can be omitted. These advantages make the manufacturing process of the photoluminescent structure 23 for the PL display device 1 easier to be controlled. Thickness non-uniformity of the photoluminescent structure 23 caused during the forming process of the first light-conversion layer 231 and the second light-conversion layer 232 due to misalignment is avoided. Thus the manufacturing yield can be effectively improved.

As shown in FIG. 2A, the photoluminescent display panel 20 of the PL display device 1 may optionally include a planarization layer 24 and a short-pass filter 25, both of which are disposed on the photoluminescent structure 23 facing toward the blue light source 10. In other words, the planarization layer 24 and/or the short-pass filter 25 are closer to the blue light source 10 than the photoluminescent structure 23.

The planarization layer 24, made of a substantially transparent light-transmitting material, covers and flattens the photoluminescent structure 23. With a flat light-receiving surface, the photoluminescent display panel 20 can be properly laminated onto the blue light source 10. If the photoluminescent structure 23 possesses a substantially flat light-receiving surface or the photoluminescent display panel 20 is not to be adhered to the blue light source 10, the planarization layer 24 may be omitted.

Figure 2C:
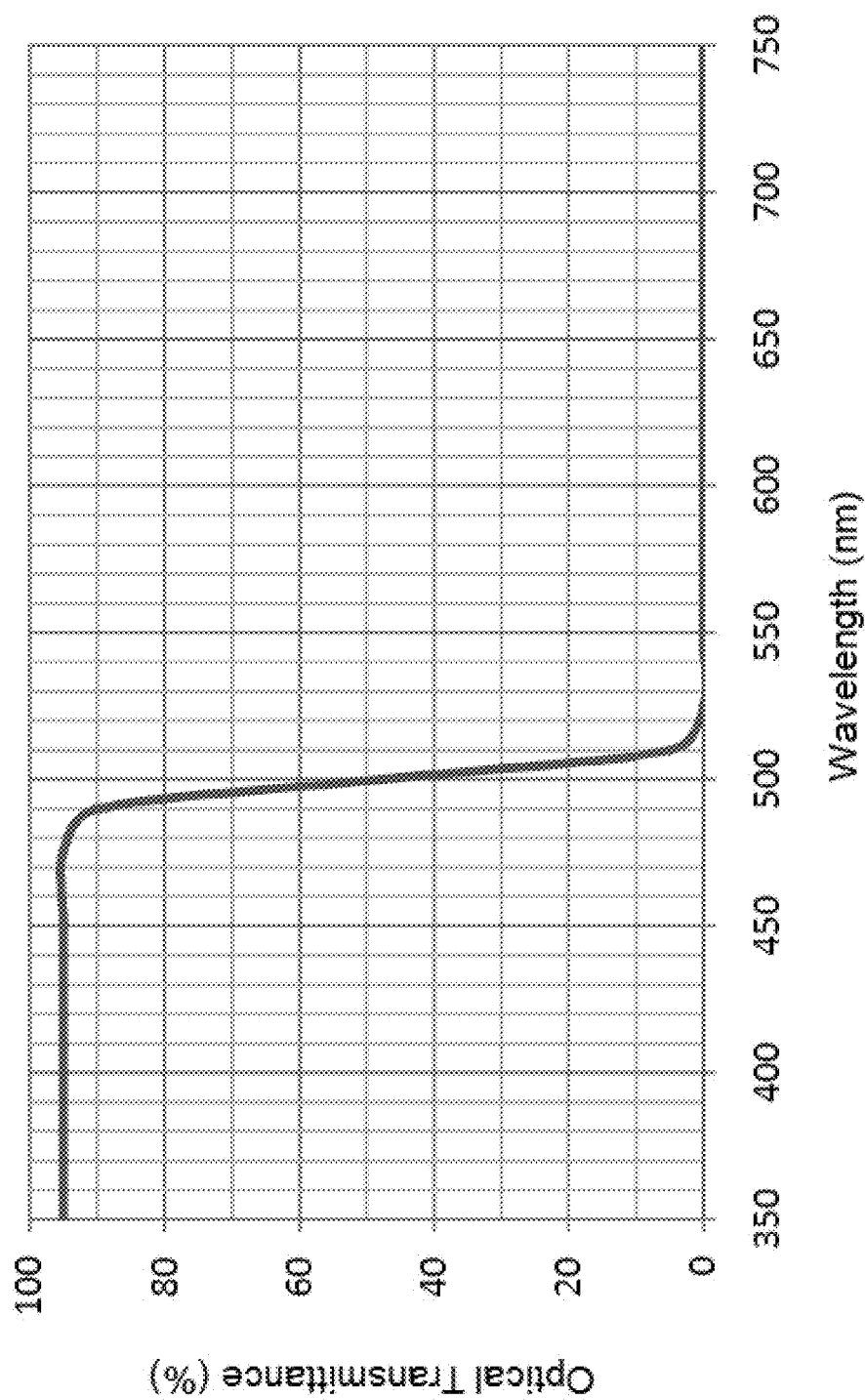
FIG. 2C shows a plot of Optical Transmittance vs. Wavelength of a short-pass filter.

FIG. 2C illustrates a plot of Optical Transmittance vs. Wavelength of the short-pass filter 25. The short-pass filter 25 has a higher optical transmittance at shorter wavelength region (e.g. <about 500 nm) and a lower transmittance at longer wavelength region (e.g. >about 500 nm), which allows the blue light B to pass through but reflects back the red light R and the green light G, so that the red light R and the green light G backward scattered by the photoluminescent structure 23 can be prevented from irradiating toward the blue light source 10. Specifically, when the blue light B is converted into the red light R or the green light G by the photoluminescence structure 23, the red light R or the green light G are irradiated forward and backward simultaneously. A portion of the red light R and the green light G may be backward scattered toward the blue light source 10. The short-pass filter 25 can reflect back the backward scattered red light R and the green light G so that they are forced to emit toward and escape from the transparent substrate 21, therefore increasing the light energy utilization efficiency. The short-pass filter 25 may be implemented using a Distributed Bragg reflector (DBR) or the like.

The aforementioned paragraphs are detailed descriptions of the embodiment related to the PL display device 1. Detailed descriptions of other embodiments of PL display devices according to the present disclosure are explained as follows. It will be appreciated that some detailed descriptions of the features and advantages found in the following embodiments of the PL display devices are similar to those of the PL display device 1 and are therefore omitted for the purpose of brevity.

Figure 3A:
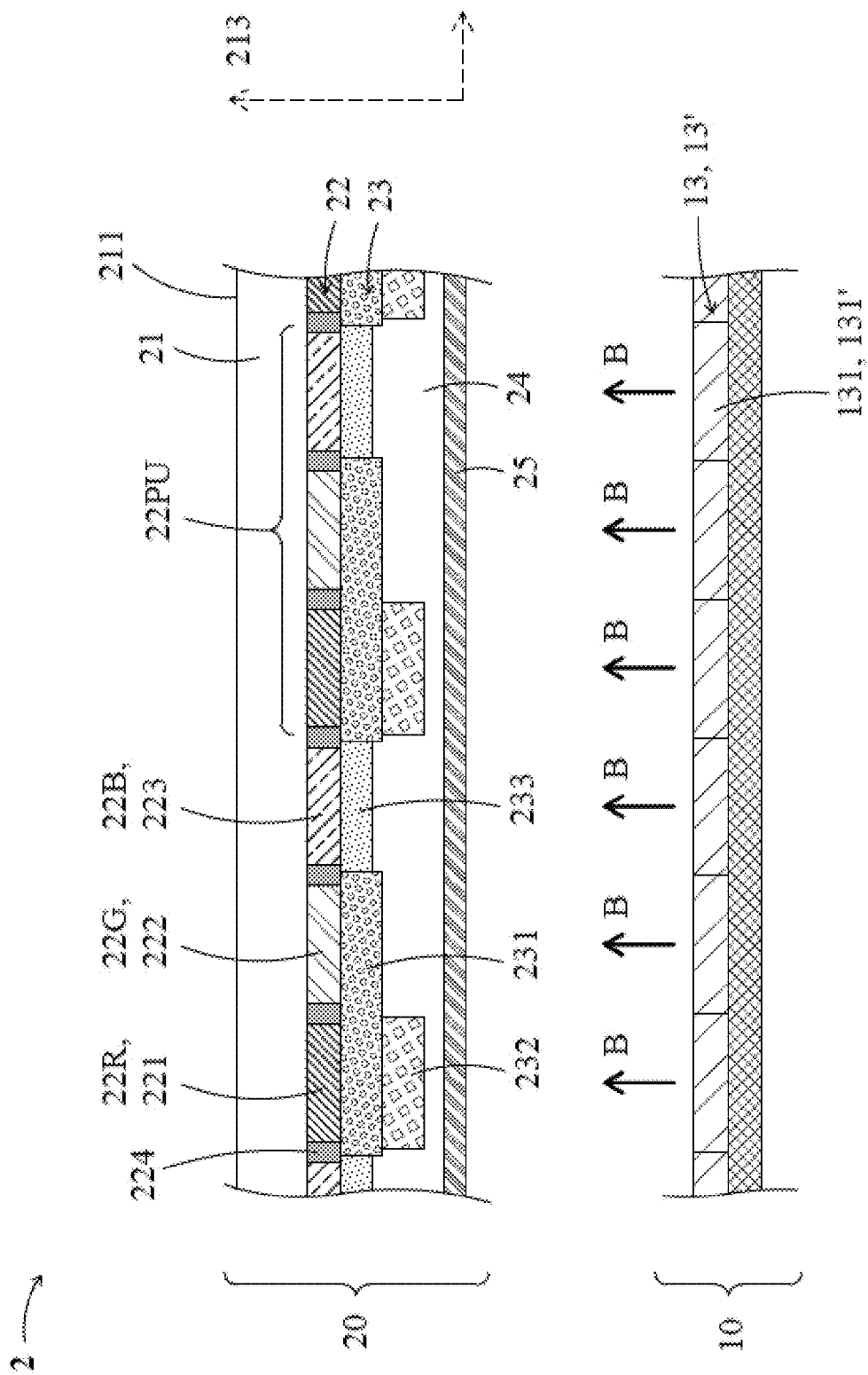
FIG. 3A and FIG. 3B are schematic drawings illustrating a photoluminescent display device according to another embodiment of the present disclosure.
Figure 3B:
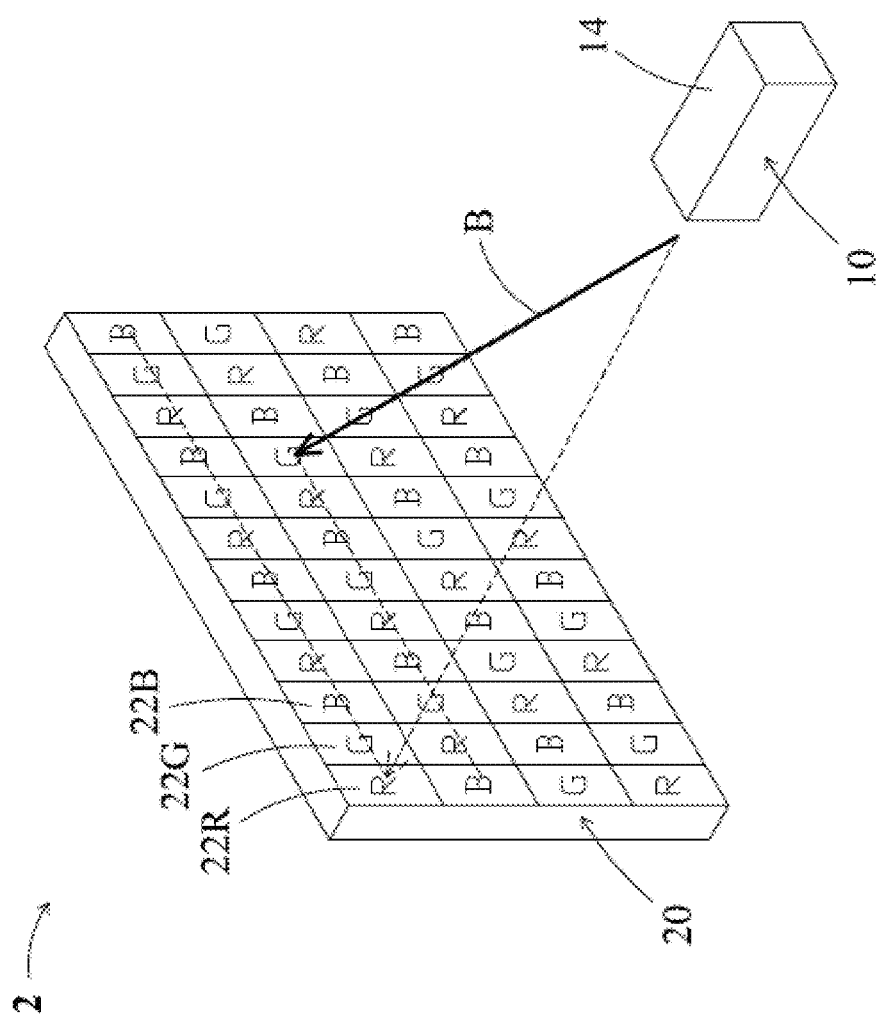

FIGS. 3A and 3B are two schematic drawings of a PL display device 2 according to another embodiment of the present disclosure. The PL display device 2 also comprises a blue light source 10 and a photoluminescent display panel 20. The photoluminescent display panel 20 is substantially the same as the photoluminescent display panel 20 of the aforementioned embodiment or the other embodiments, but the blue light source 10 may comprise an organic or inorganic light emitting diode module 13, or a blue laser diode scanning micro-mirror module 14.

As shown in FIG. 3A, the organic light emitting diode (OLED) module 13 may comprise an array of OLEDs 131 arranged side by side, and each of the OLEDs 131 can be electrically energized to generate a blue light B. Therefore, through energizing a specific OLED 131 to generate the blue light B, the display image of the corresponding pixel regions (e.g., the red pixel region 22R, the green pixel region 22G, or the blue pixel region 22B) of the display panel 20 can be selected to be turned on.

Similarly, the OLED module 13 embodied with an array of the OLEDs 131 can be implemented as an LED module 13' by using an array of inorganic LEDs 131'. Thus, the blue light source 10 embodied using the LED module 13' can have a higher optical efficiency and longer operation lifetime compared with that using the OLED module 13.

As shown in FIG. 3B, the blue laser diode scanning micro-mirror module 14 may comprise a blue laser diode and a scanning micro-mirror mechanism (not illustrated). The blue laser diode may generate a collimated blue light B emitted to the scanning micro-mirror mechanism, and then the scanning micro-mirror mechanism reflects the blue light B to specific pixel regions (e.g., the red pixel region 22R, the green pixel region 22G or the blue pixel region 22B) of the display panel 20. The scanning micro-mirror mechanism may change its reflection angle so that the specific pixel regions can be irradiated by the collimated blue light B.

Thus, through the OLED module 13, LED module 13' or the blue laser scanning micro-mirror module 14, the blue light source 10 can provide the blue light B emitted to the display panel 20 so that specified color images are displayed accordingly.

Figure 4:
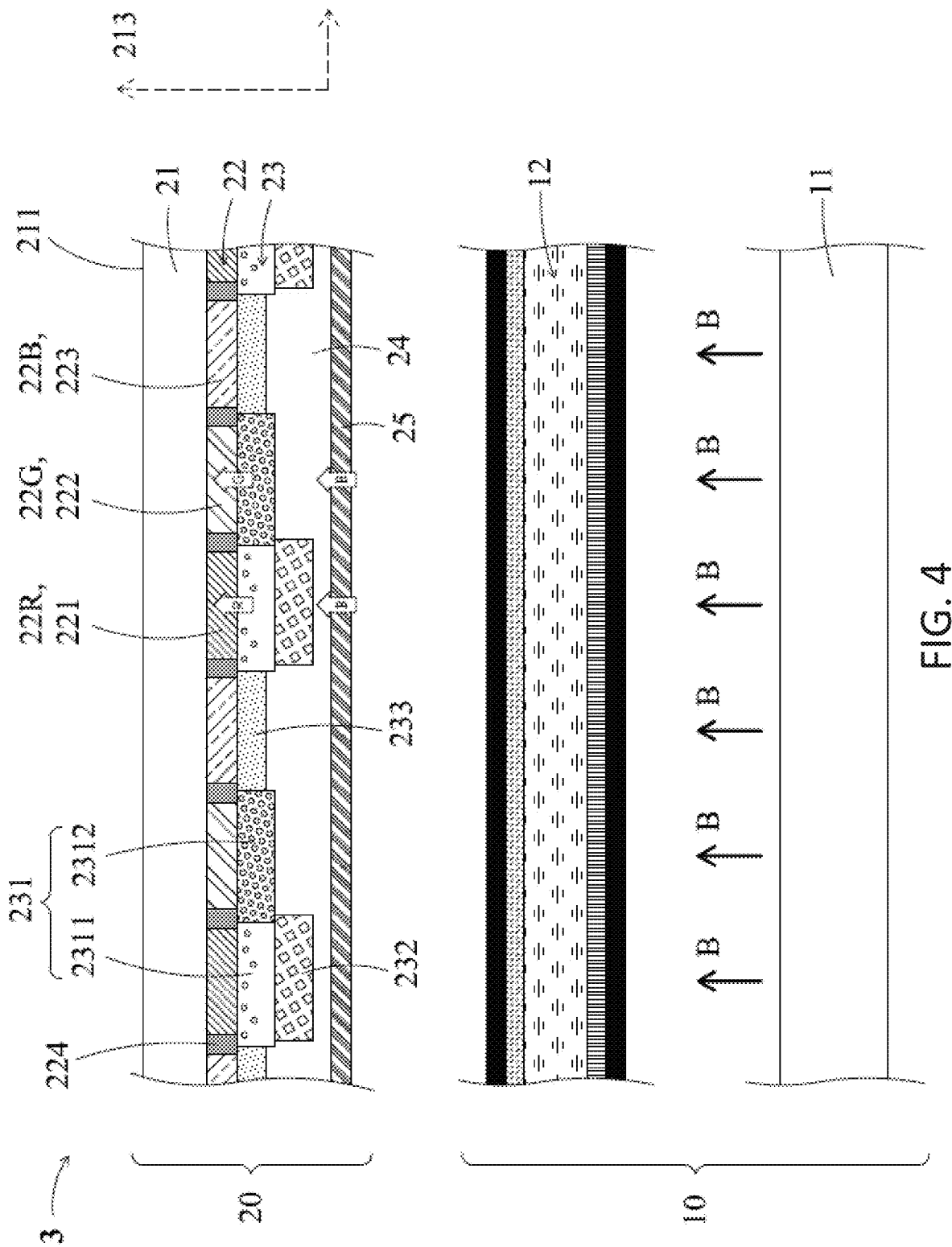
FIG. 4 is a schematic drawing in a cross-sectional view illustrating a photoluminescent display device according to another embodiment of the present disclosure.

FIG. 4 shows a schematic drawing in cross-sectional view illustrating a PL display device 3 according to another embodiment of the present disclosure. A difference between the PL display device 3 and the aforementioned PL display devices 1 or 2 is that the green photoluminescent material included in the first light-conversion layer 231 of the PL display device 3 is selectively or non-uniformly distributed.

Specifically, the first light-conversion layer 231 includes a first region 2311 and a second region 2312 adjacent to each other. The first region 2311 covers the red region 22R, and the second region 2312 covers the green region 22G. Both regions 2311 and 2312 are formed in one single process. The second light-conversion layer 232 is subsequently disposed on the first region 2311, and does not cover or exposes at least a portion of the second region 2312. The green photoluminescent material included in the first light-conversion layer 231 has a higher concentration in the second region 2312 than that in the first region 2311, such as at least about 2 times, at least about 5 times, or at least about 10 times higher. It will be appreciated that the green photoluminescent material may be selectively or solely disposed in the second region 2312 so that there is minimum green photoluminescent material disposed in the first region 2311.

Referring to FIG. 2B again, the blue light B irradiated toward the second light-conversion layer 232 is converted into the red light R by a red photoluminescent material, and the red light R subsequently passes through the first region 2311 and the red pixel region 22R, and then irradiates outwardly from the light-emitting surface 211 of the transparent substrate 21. Since the first region 2311 includes minimum, or even no, green photoluminescent material, the red light R is less likely to be blocked and scattered by the green photoluminescent material while passing through the first region 2311. This embodiment will further reduce the light energy loss due to blocking or scattering. Therefore, more red light R can pass through the first region 2311 for brighter display images on the red pixel region 22R.

Furthermore, the thicknesses of the first region 2311 and the second region 2312 of the first light-conversion layer 231 may be specified to be substantially the same, or may be specified to be different depending on the design specifications.

Figure 5A:
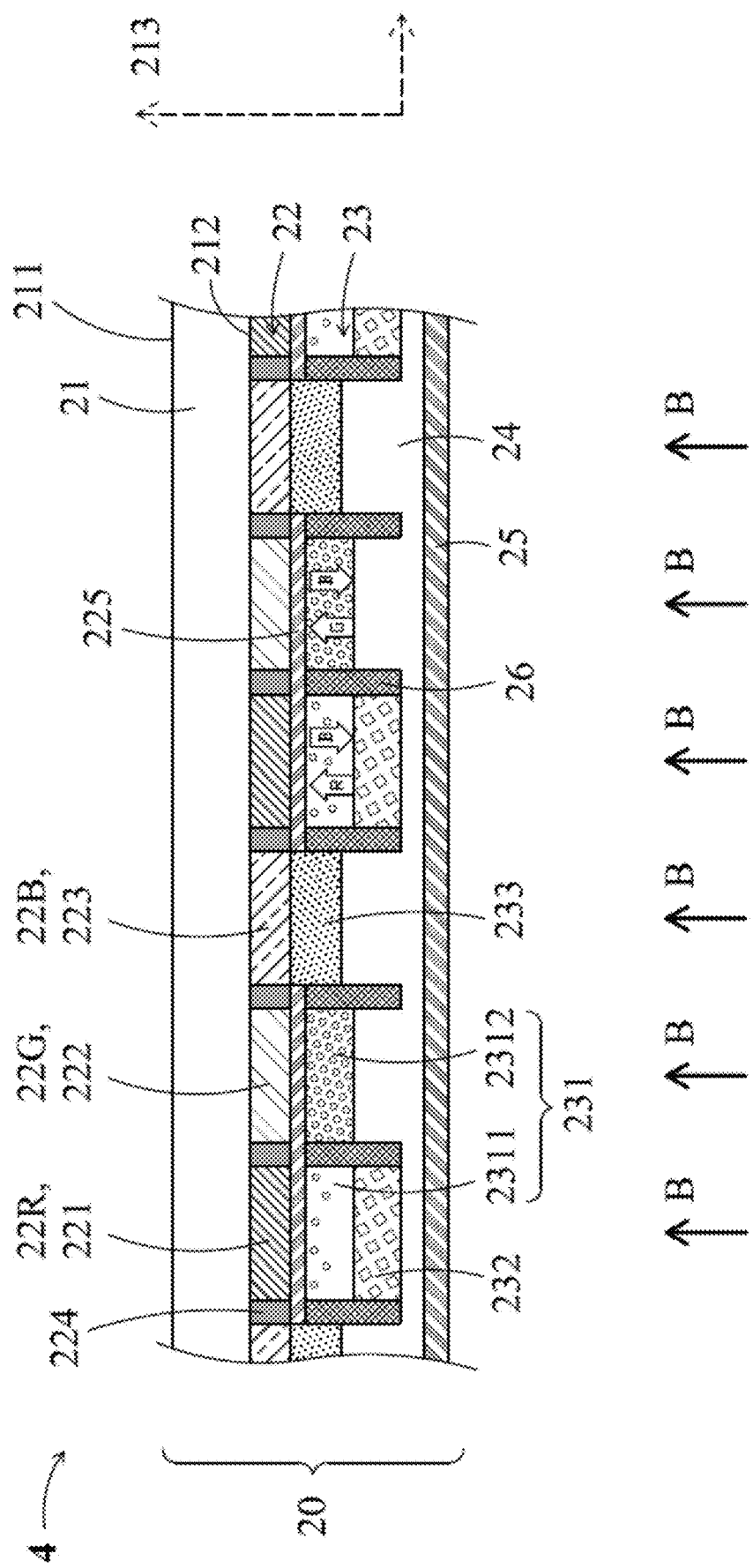
FIG. 5A is a schematic drawing in a cross-sectional view illustrating a photoluminescent display device according to another embodiment of the present disclosure.

FIG. 5A illustrates a schematic drawing in a cross-sectional view of a PL display device 4 according to another embodiment of the present disclosure (the blue light source 10 is not illustrated). A difference between the PL display device 4 and the aforementioned PL display devices 1 or 3 is that a long-pass filter 225 is disposed before a color filter structure 22 along the light irradiation path of the PL display device 4. The display panel 20 further includes a reflective structure 26 surrounding the photoluminescent structure 23.

Figure 5B:
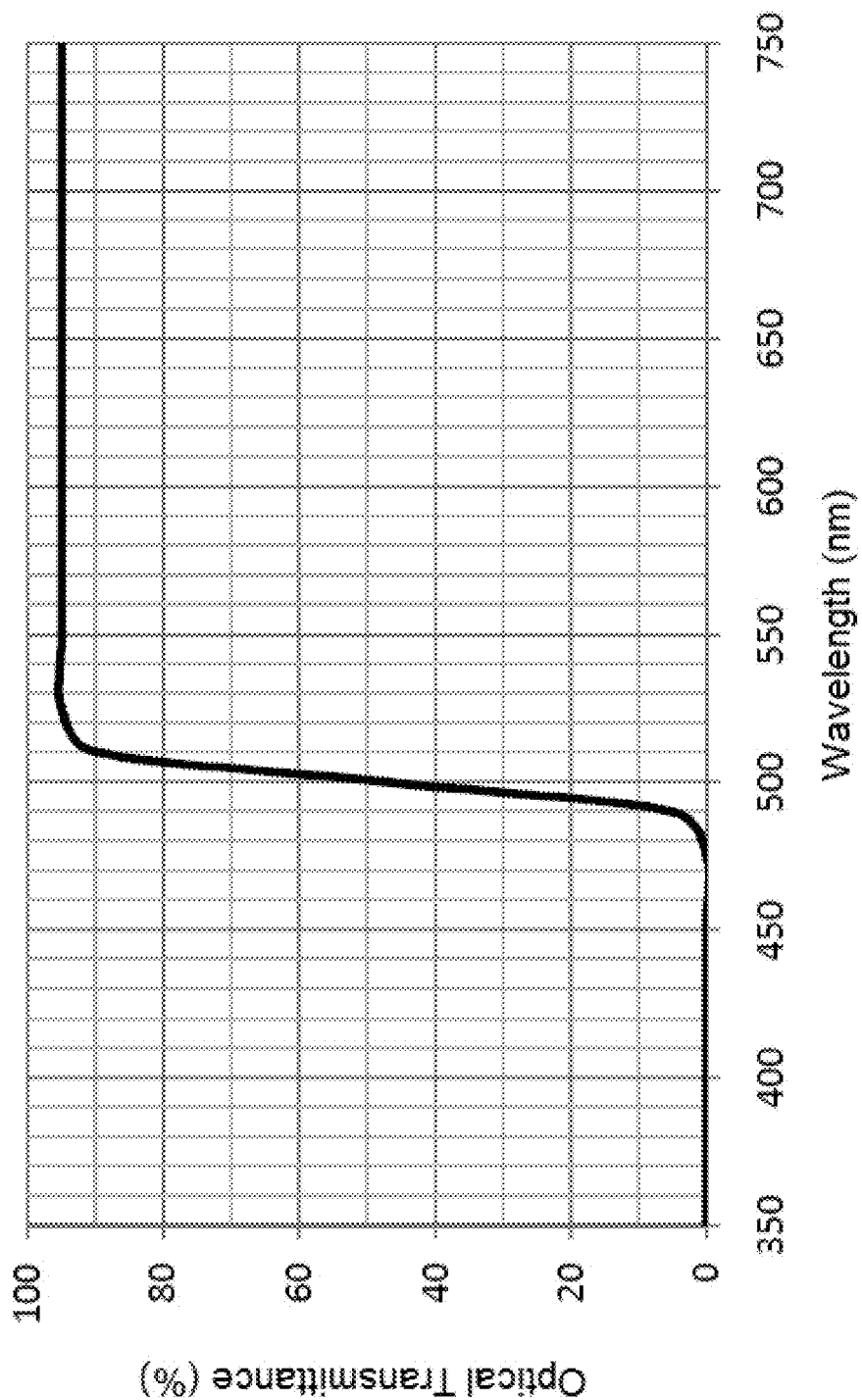
FIG. 5B shows a plot of Optical Transmittance Rate vs. Wavelength of a long-pass filter.

Specifically, the long-pass filter 225 is disposed facing the blue light source (not illustrated) and covering both the red pixel region 22R and the green pixel region 22G, but not covering or exposing the blue pixel region 22B. FIG. 5B illustrates a plot of Optical Transmittance vs. Wavelength of the long-pass filter 225, which is designed to reflect back the blue light B, but to allow the red light R and the green light G to pass through. Thus, when the blue light B passes through the first light-conversion layer 231 and the second light-conversion layer 232 respectively and is not totally converted into the green light G and the red light R, the unconverted blue light B can be reflected backwardly by the long-pass filter 225 toward the first light-conversion layer 231 and the second light-conversion layer 232. Therefore, the unconverted reflected blue light B has another wavelength conversion opportunity to be converted into the green light G and the red light R, and can subsequently escape out of the green pixel region 22G and the red pixel region 22R of the PL display device 4, respectively.

Therefore, the long-pass filter 225 is specified to ensure that the blue light B can be substantially converted into the green light G and the red light R by the first light-conversion layer 231 and the second light-conversion layer 232, respectively, so that the unconverted blue light B is prevented from being absorbed by the color filter structure 22. Therefore the light energy utilization efficiency of the PL display device 4 is further improved. Desirably, the long-pass filter 225 can be implemented in conjunction with the PL display device 3 according to one embodiment of the present disclosure, wherein the first region 2311 of the first light-conversion layer 231 has a minimum amount of the green photoluminescent material with lower concentration, or even no green photoluminescent material, to achieve a better overall efficiency. In addition, the long-pass filter 225 may selectively or solely cover the red pixel region 22R or the green pixel region 22G according to various design specifications.

The reflective structure 26 is disposed on the color filter structure 22 facing toward the blue light source (not illustrated), and the reflective structure 26 is disposed to be aligned with the red pixel region 22R, the green pixel region 22G or the blue pixel region 22B when projected along the normal direction 213. In other words, from the cross-sectional view shown in FIG. 5A, two sidewalls of the reflective structure 26 are aligned with two side edges of the blue pixel region 22B. From the top view, the blue pixel region 22B is surrounded by four sidewalls of the reflective structure 26. Similarly, the red pixel region 22R and the green pixel region 22G are each surrounded by four sidewalls of the reflective structure 26. Desirably, the reflective structure 26 is disposed to be aligned with the black matrix layers 224 of the red pixel region 22R, aligned with the black matrix layers 224 of the green pixel region 22G, and aligned with the black matrix layers 224 of the blue pixel region 22B. The shape of the reflective structure 26 is substantially the same as the shape of the black matrix layers 224.

The photoluminescent structure 23 is disposed inside the reflective structure 26, wherein the first region 2311 of the first light-conversion layer 231 together with the second light-conversion layer 232, the second region 2312 of the first light-conversion layer 231, and the light-transmitting layer 233 are divided and surrounded by the reflective structure 26.

Since the red light R, the green light G, and the blue light B will be reflected by the reflective structure 26, the light energy utilization efficiency of the PL display device 4 is further improved. Specifically, the red light R, for example, may be scattered inside the photoluminescent structure 23 so that a portion of the red light R is transmitted laterally toward the green pixel region 22G or the blue pixel region 22B. However, the reflective structure 26 will block the red light R from transmitting laterally and force it to escape from the red pixel region 22R of the PL display device 4. The reflective structure 26 provides similar isolation mechanism to block the green light G and the blue light B from cross coupling and force the light to escape out of the display device 4.

Therefore, the reflective structure 26 can block the light from transmitting laterally, and force the red light R, the green light G and the blue light B passing through respective regions of the color filter structure 22, so that the PL display device 4 can have better light energy utilization efficiency.

The reflective structure 26 can be made of a transparent resin material, such as polyphthalamide, polycyclohexylene-di-methylene terephthalate, epoxy molding compound, photosensitive resin and so forth, dispersed with light scattering particles inside the resin material. The reflective structure 26 may also be made of an inorganic material such as a metal, or may be made by forming the reflective structure 26 by using a resin material first, and then by coating a reflective metal layer on a surface of the resin material.

Both of the long-pass filter 225 and the reflective structure 26 can effectively increase the light energy utilization efficiency of the PL display device 4. However, it is not always necessary to include both of them simultaneously. Depending on the design specification, one of the long-pass filter 225 and the reflective structure 26 can be selectively included to form PL display device 4.

Figure 6:
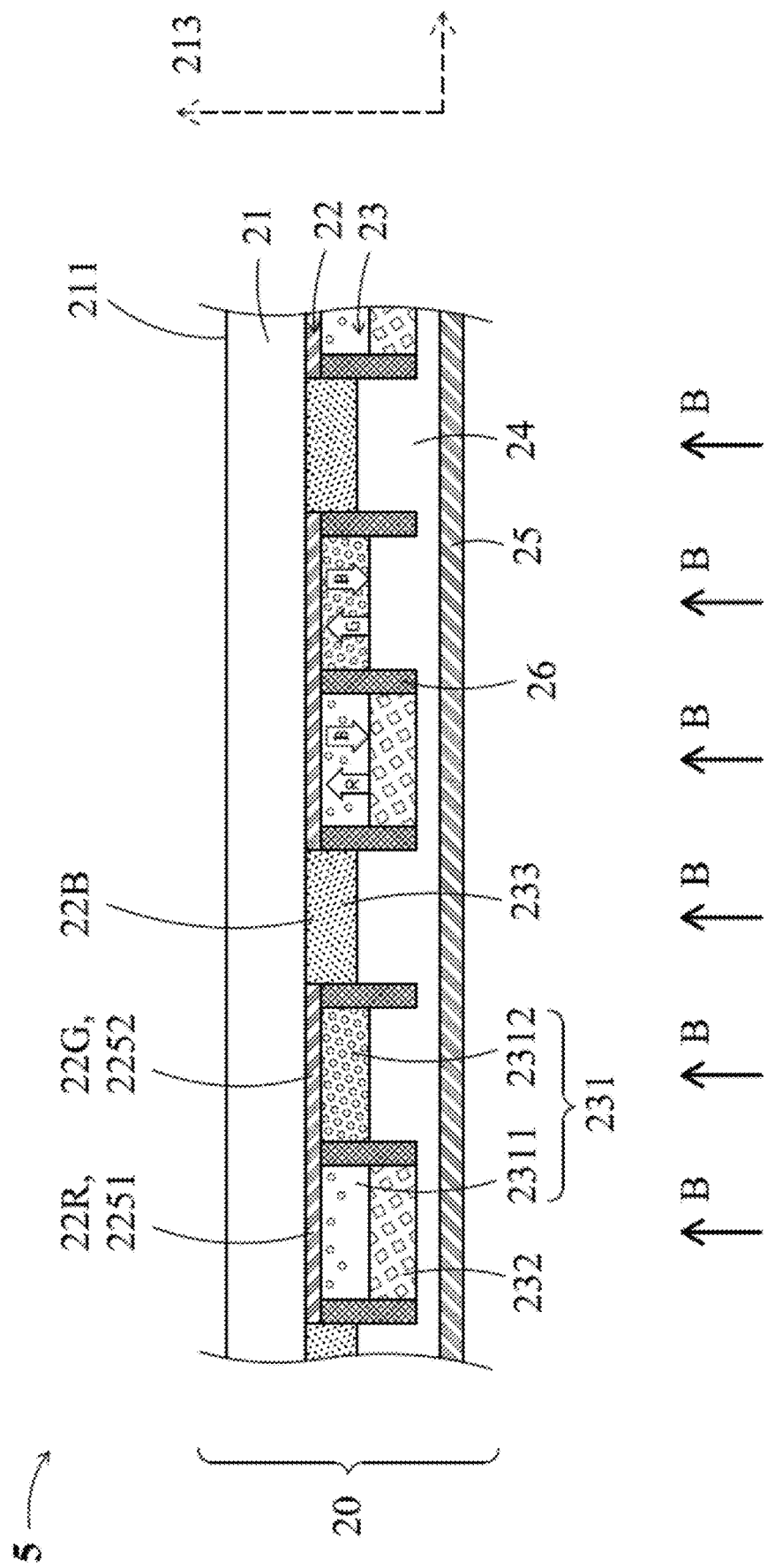
FIG. 6 is a schematic drawing in a cross-sectional view illustrating a photoluminescent display device according to another embodiment of the present disclosure.

FIG. 6 illustrates a schematic drawing in a cross-sectional view of a PL display device 5 according to another embodiment of the present disclosure (the blue light source 10 is not illustrated). A difference between the PL display device 5 and the aforementioned PL display device 4 is that the color filter structure 22 of the PL display device 5 is different from that of PL display device 4.

Specifically, for the PL display device 5, the red pixel region 22R of the color filter structure 22 includes a first long-pass filter 2251, the green pixel region 22G includes a second long-pass filter 2252, but the blue pixel region 22B does not include a long-pass filter. In addition, the red pixel region 22R, the green pixel region 22G and the blue pixel region 22B do not include a red color filter, a green color filter and a blue color filter, respectively. Here, since the blue pixel region 22B does not include a blue color filter or a high-pass filter, the light-transmitting layer 233 of the photoluminescent structure 23 may be adjacent to and in direct contact with the transparent substrate 21.

As detailed in previous paragraphs, the first and the second long-pass filters 2251 and 2252 are specified so that the blue light B is substantially converted into the red light R and the green light G by the second light-conversion layer 232 and the first light-conversion layer 231, respectively. Also, the reflective structure 26 is specified so that the red light R, the green light G, and the blue light B do not cross couple with one another across pixel regions. Therefore, the red light R, the green light G and the blue light B selectively pass through the red pixel region 22R, the green pixel region 22G and the blue pixel region 22B, respectively.

As a result, the red, green and blue color filters can be omitted for the red pixel region 22R, the green pixel region 22G and the blue pixel region 22B, respectively, so that the PL display device 5 can still display color images effectively without light cross coupling among three color pixel regions. Desirably, the PL display device 5 may be implemented as another embodiment of the PL display device 3 to achieve a desirable overall performance, wherein the first region 2311 of the first light-conversion layer 231 includes little or no green photoluminescent material.

Figure 7A:
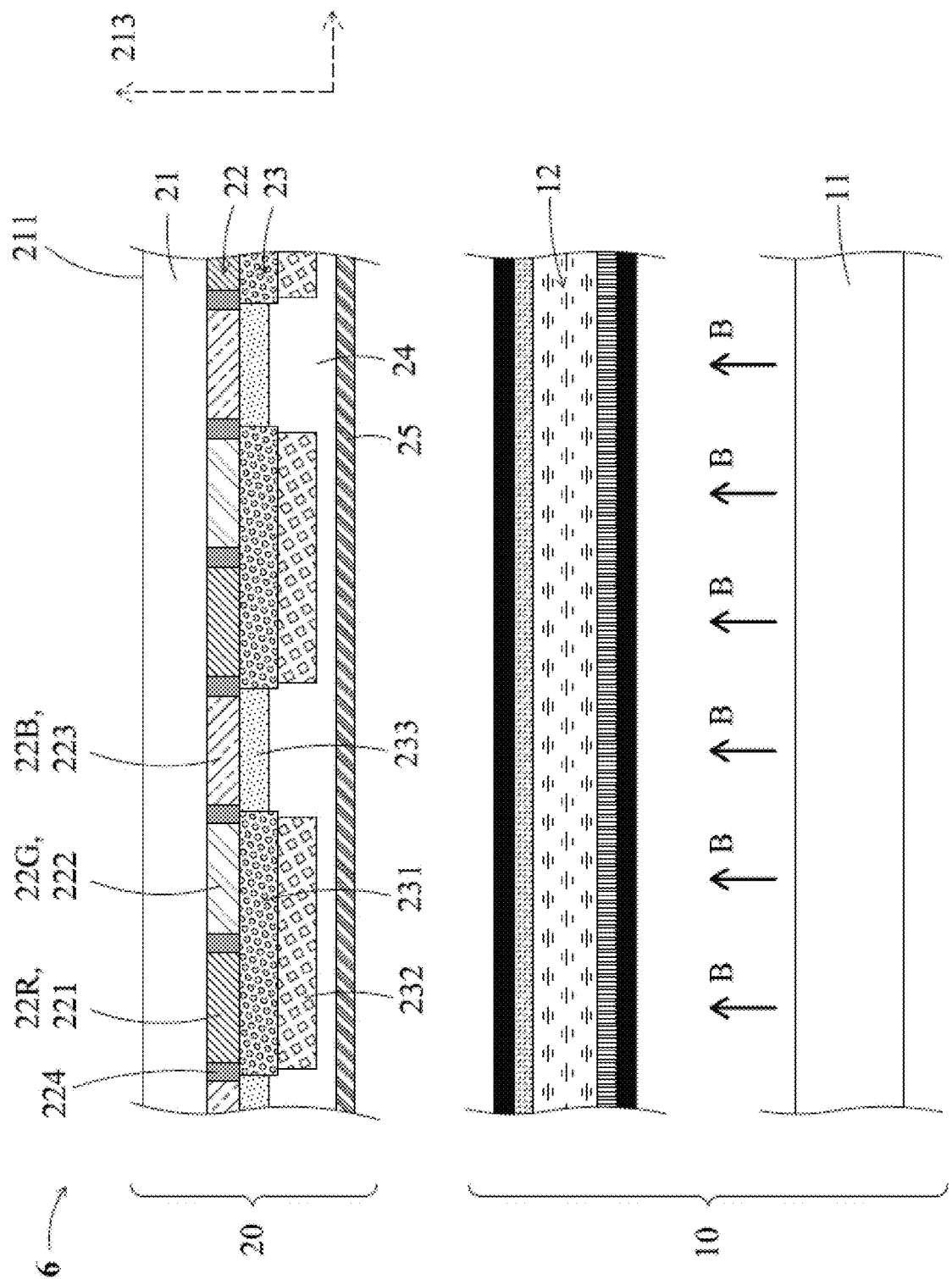
FIG. 7A is a schematic drawing in a cross-sectional view illustrating a photoluminescent display device according to another embodiment of the present disclosure.

FIG. 7A illustrates a schematic drawing in a cross-sectional view of a PL display device 6 according to another embodiment of the present disclosure. A difference between the PL display device 6 and the aforementioned PL display device 1 is that the second light-conversion layer 232 included in the photoluminescent structure 23 of the PL display device 6 is disposed to cover both the red pixel region 22R and the green pixel region 22G (e.g., substantially the same covering or projection area as the first light-conversion layer 231). Desirably, the pixel size of the second light-conversion layer 232 may be embodied to be slightly smaller than that of the first light-conversion layer 231 so that this layout specification facilitates the fabrication process of the photoluminescent structure 23.

Figure 7B:
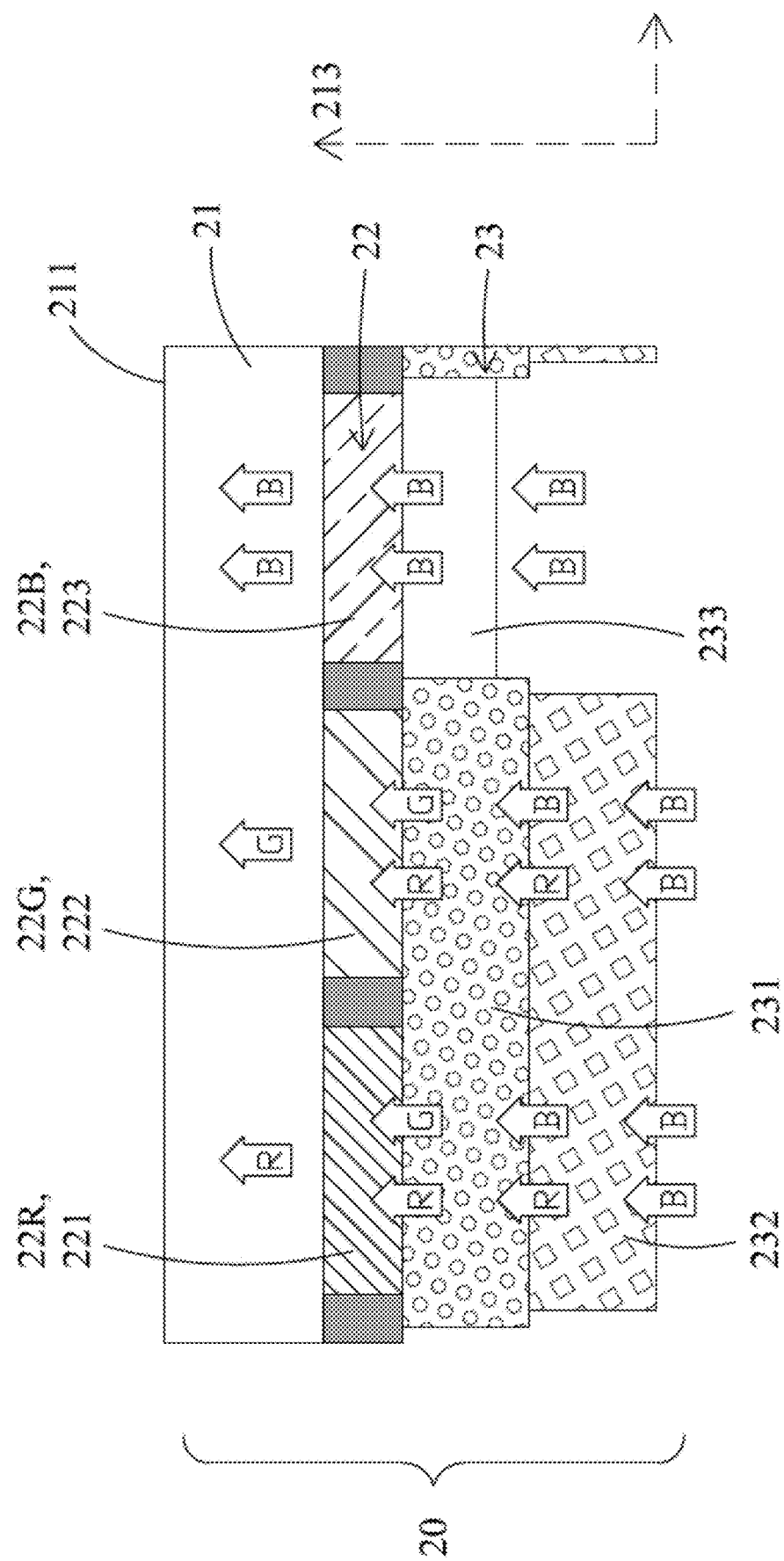
FIG. 7B is a schematic drawing illustrating a color conversion mechanism of the photoluminescent display device shown in FIG. 7A with blue incident light passing through a photoluminescent display panel.

FIG. 7B illustrates a color conversion mechanism of the photoluminescent display device 6 while the blue light B passes through the display panel 20. The blue light B emitted from the blue light source 10 can be divided into three portions irradiating toward the red pixel region 22R, the green pixel region 22G and the blue pixel region 22B, respectively.

The blue light B toward the blue pixel region 22B will pass through the light-transmitting layer 233 and the blue pixel region 22B sequentially as part of display images of the PL display device 6.

The blue light beam B toward the red pixel region 22R and the green pixel region 22G will pass through the second light-conversion layer 232 first. The second light-conversion layer 232 has a lower amount of the red photoluminescent material than that of the red photoluminescent material of the PL display device 1, so that a portion (for example, about one-half) of the blue light B passing through the second light-conversion layer 232 is converted into the red light spectrum R, and the rest is still in the blue light spectrum B. In other words, the blue light B passes through the second light-conversion layer 232 to become a red and blue mixed light composed of the red light spectrum R and the blue light spectrum B.

Subsequently, the light with mixed red-blue spectrum passes through the first light-conversion layer 231, wherein the green photoluminescent material of the first light-conversion layer 231 converts the blue light spectrum B portion of the red-blue mixed light into the green light G. In other words, the red-blue mixed light passes through the second light-conversion layer 232 and then becomes a red-green mixed light composed of the red light spectrum R and the green light spectrum G. Then, the red-green mixed light reaches the color filter structure 22, wherein the red pixel region 22R allows the red light spectrum R to pass through and absorbs the other light spectrum, and the green pixel region 22G allows the green light spectrum G to pass through and absorbs the other light spectrum. Finally, the red light spectrum R and the green light spectrum G passing through the color filter structure 22 are irradiated outwardly to form the specified display images of the PL display device 6.

It will be appreciated that a portion (for example, about one-half) of the red-green mixed light generated by the photoluminescent structure 23 is blocked and absorbed by the red pixel region 22R and the green pixel region 22G of color filter structure 22. Thus, the PL display device 6 has a relatively lower light energy utilization efficiency, especially for the red light R and the green light G, compared with that of the PL display device 1. However, the efficiency is still higher than that of a comparison LCD device. For the blue light spectrum B, the PL display device 6 has a much higher light energy utilization efficiency (for example, close to about 100%) compared with that of the comparison LCD device (roughly 30%). For the green light spectrum G and the red light spectrum R, about 50% of the light generated by the blue backlight source 10 is utilized as display images; whereas roughly 30% of the light generated by a white backlight source is utilized as display images in the LCD device.

Even though the PL display device 6 has a lower light energy utilization efficiency, on the other hand, the fabrication process of the PL display device 6 is easier. Because both the first light-conversion layer 231 and the second light-conversion layer 232 are disposed to cover the red pixel region 22R and the green pixel region 22G of the color filter structure 22, both the second light-conversion layer 232 and the first light-conversion layer 231 have larger pixel areas, facilitating the alignment between the first light-conversion layer 231 and the second light-conversion layer 232 during the manufacturing process. In addition, the pixel area of the second light-conversion layer 232 may be slightly smaller than that of the first light-conversion layer 231. Thus the allowable tolerance is increased during fabrication so that high-precision pixel alignment is not required. Therefore, manufacturing of the photoluminescent structure 23 of the PL display device 6 is streamlined.

Figure 8:
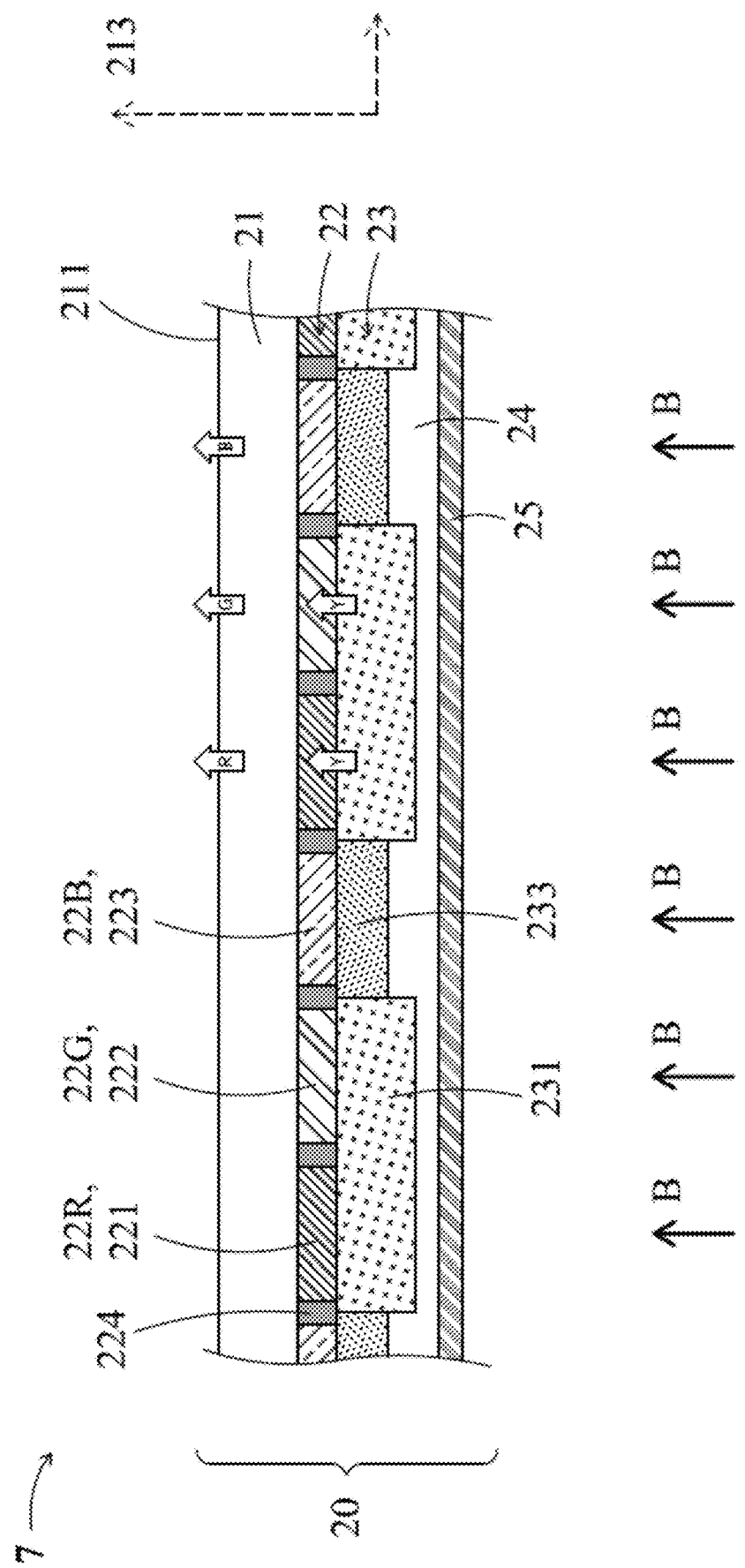
FIG. 8 is a schematic drawing in a cross-sectional view illustrating a photoluminescent display device according to another embodiment of the present disclosure.

FIG. 8 illustrates a schematic drawing in a cross-sectional view of a PL display device 7 according to another embodiment of the present disclosure. A difference between the PL display device 7 and the aforementioned PL display device 6 is that both the red and the green photoluminescent materials are uniformly distributed inside the first light-conversion layer 231.

Therefore, the blue light B emitted from the blue light source 10 (not illustrated) can be converted into the red-green mixed spectrum of light composed of the red light spectrum R and the green light spectrum G by the first light-conversion layer 231. Then the red pixel region 22R and the green pixel region 22G will selectively allow the desired red light spectrum R and green light spectrum G to pass through, respectively. Therefore, the PL display device 7 displays images composed of the red light spectrum R and the green light spectrum G similar to the image display mechanism of the PL display device 6. Thus, the PL display devices 7 and 6 have similar light energy utilization efficiency in utilizing the red light spectrum R and the green light spectrum G. In this embodiment, the alignment issue between the first light-conversion layer 231 and the second light-conversion layer 232 can be avoided to further streamline the fabrication process.

The first light-conversion layer 231 may also include a yellow photoluminescent material instead of the mixed red and green photoluminescent materials. An example yellow photoluminescent material is a Yttrium Aluminum Garnet (YAG) material. Therefore, the blue light B irradiated from the blue light source 10 (not illustrated) can be converted into a yellow light Y by the first light-conversion layer 231. Because the spectrum of the yellow light Y contains both of the red light spectrum and the green light spectrum, the red pixel region 22R and the green pixel region 22G of the color filter structure 22 can allow the desired red light R and the green light G to pass through, respectively, for displaying images.

Figure 9A:
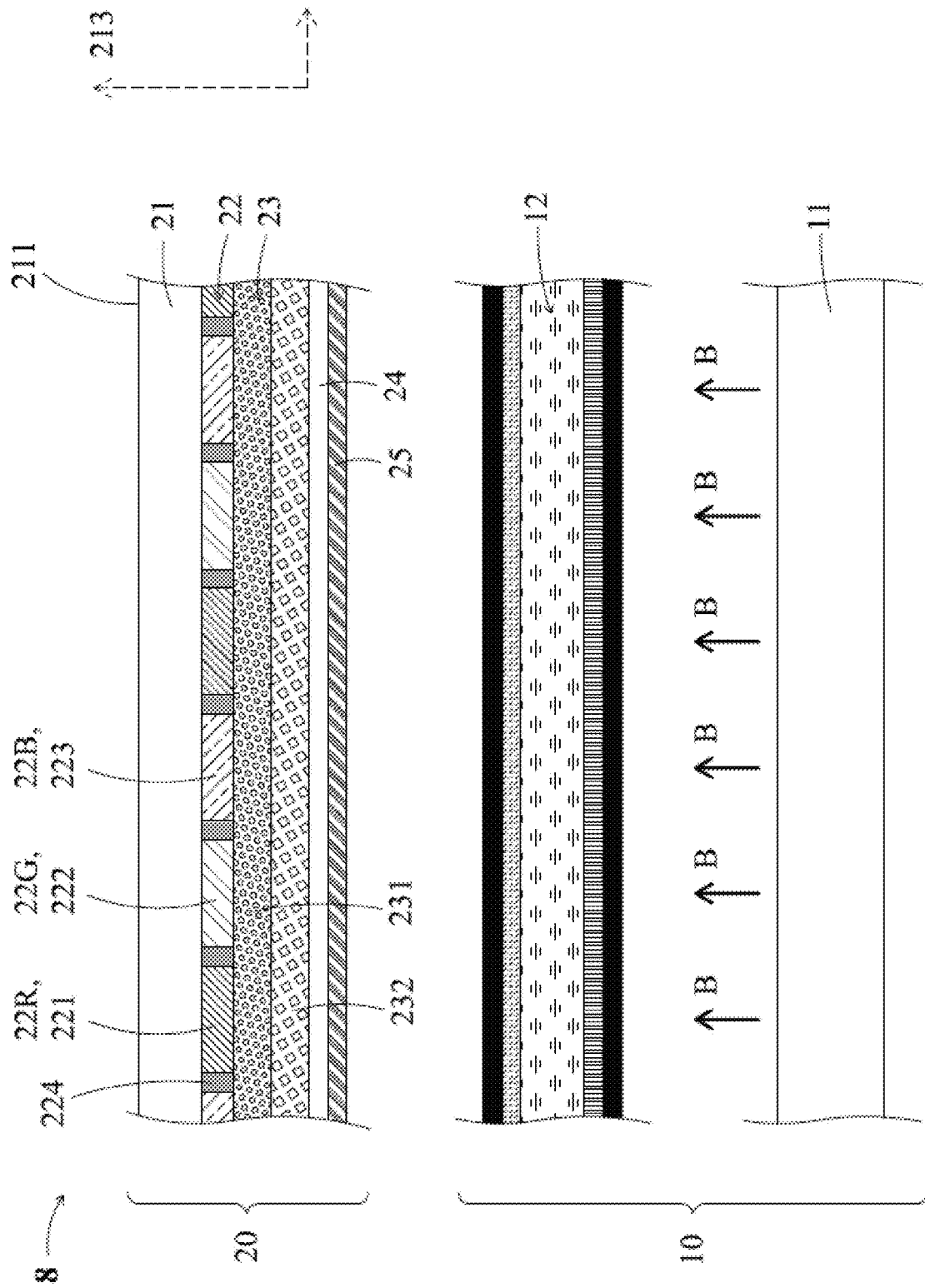
FIG. 9A is a schematic drawing in a cross-sectional view illustrating a photoluminescent display device according to another embodiment of the present disclosure.

FIG. 9A illustrates a schematic drawing in a cross-sectional view of a PL display device 8 according to another embodiment of the present disclosure. A difference between the PL display device 8 and the aforementioned PL display device 6 is that both of the first light-conversion layer 231 and the second light-conversion layer 232 of the photoluminescent structure 23 are disposed to cover the red pixel region 22R, the green pixel region 22G, as well as the blue pixel region 22B.

Figure 9B:
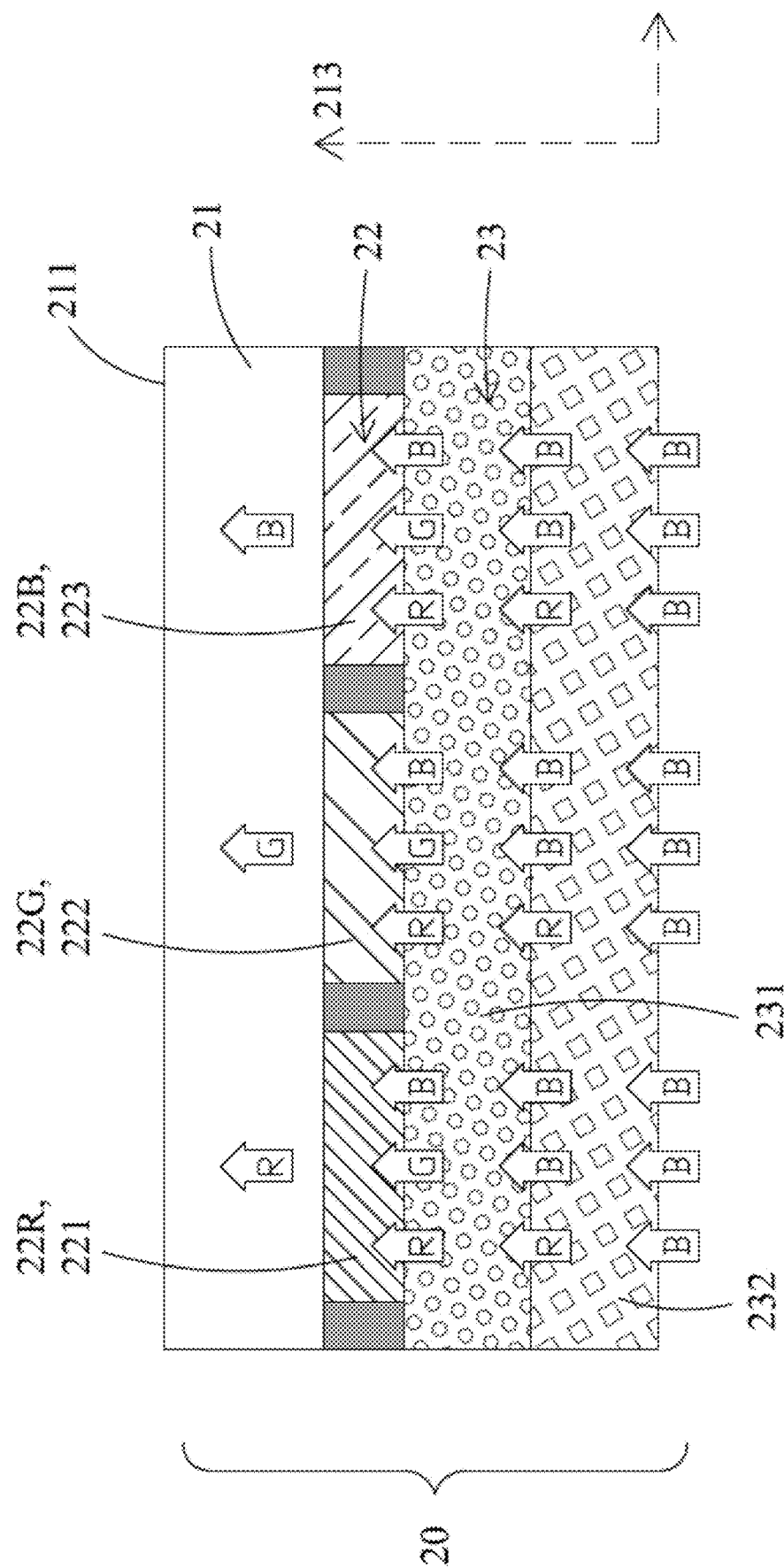
FIG. 9B is a schematic drawing illustrating a color conversion mechanism of the photoluminescent display device shown in FIG. 9A with blue incident light passing through a photoluminescent display panel.

FIG. 9B illustrates a schematic drawing illustrating a color conversion mechanism while the blue light B passes through the display panel 20 of the PL display device 8. The blue light B irradiated from the blue light source 10 passes through the second light-conversion layer 232 first. The second light-conversion layer 232 has a specified amount of the red photoluminescent material, so that a portion (for example, about one-third) of the blue light B passing through the second light-conversion layer 232 is converted into the red light R, and the rest (for example, about two-thirds) is still in the blue light spectrum B. In other words, after the blue light B passes through the second light-conversion layer 232, it becomes a red-blue mixed light with spectrum composed of slightly less red light R and slightly more blue light B.

The red-blue mixed light subsequently irradiates through the first light-conversion layer 231. The first light-conversion layer 231 has a specified amount of the green photoluminescent material so that a portion (for example, about one-half) of the blue light B of the red-blue mixed light is converted into the green light G. In other words, the red-blue mixed light passing through the first light-conversion layer 231 becomes the red-green-blue mixed light with spectrum composed of the red light spectrum R, the green light spectrum G and the blue light spectrum B.

The red-green-blue mixed light is then transmitted through the color filter structure 22. The red pixel region 22R, the green pixel region 22G and the blue pixel region 22B of the color filter structure 22 will allow the desired red light R, green light G and blue light B to pass through, respectively, for displaying images.

Therefore, a portion (for example, about two-thirds) of the red-green-blue mixed spectrum of light generated after passing through the first light-conversion layer 231 will be blocked and absorbed by the color filter structure 22. Thus, the light energy utilization efficiency of the PL display device 8 is lower than those of the PL display devices 6 and 1. However, the light energy utilization efficiency of the PL display device 8 is still similar to or somewhat better than that of the comparison LCD device (for example, close to about one-third).

On the other hand, manufacturing of the photoluminescent structure 23 of the PL display device 8 is even more streamlined. Since both the first light-conversion layer 231 and the second light-conversion layer 232 are disposed to cover the red pixel region 22R, the green pixel region 22G and the blue pixel region 22B, no additional process to pixelate the first light-conversion layer 231 and the second light-conversion layer 232 is included. Furthermore, the alignment process among the first light-conversion layer 231, the second light-conversion layer 232, and the color filter structure 22 is not included. This will significantly reduce the manufacturing complexity in fabricating the PL display device 8. Even though the PL display device 8 does not have certain advantages in the light energy utilization efficiency, it has a large viewing angle compared to the comparison LCD device.

Figure 10:
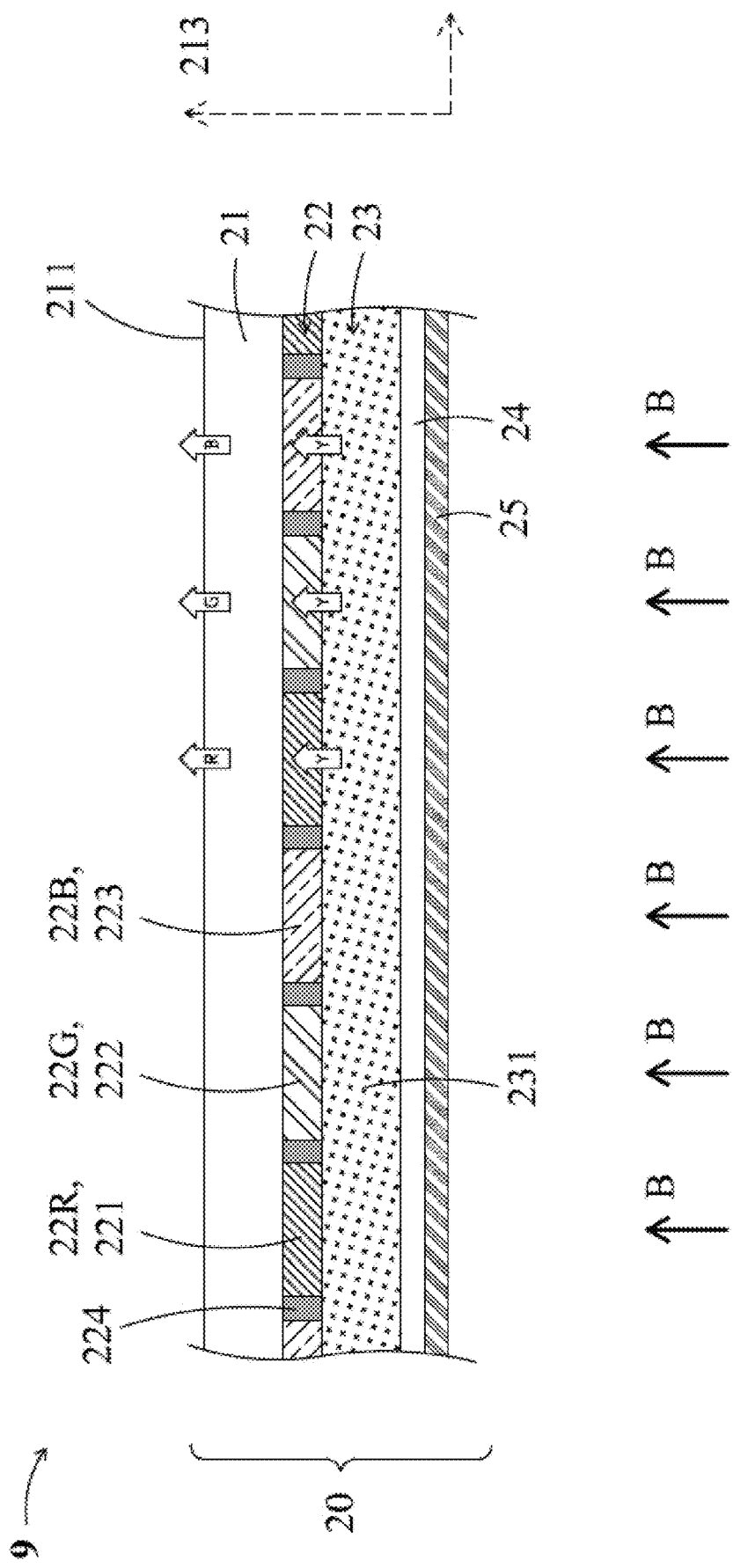
FIG. 10 is a schematic drawing in a cross-sectional view illustrating a photoluminescent display device according to another embodiment of the present disclosure.

FIG. 10 illustrates a schematic drawing in a cross-sectional view of a PL display device 9 according to another embodiment of the present disclosure. A difference between the PL display device 9 and the aforementioned PL display device 8 is that the photoluminescent structure 23 of the PL display device 9 comprises the first light-conversion layer 231, which includes both of the red and the green photoluminescent materials mixed together, and the second light-conversion layer 232 is omitted.

Therefore, the blue light B irradiated from the blue light source 10 (not illustrated) is partially (for example, about two-thirds) converted into the red light R and the green light G by the first light-conversion layer 231 to form a mixed red-green-blue light (each of them has a similar proportion). Then, the red pixel region 22R, the green pixel region 22G and the blue pixel region 22B will allow the desired red light R, green light G and blue light B to pass through for displaying images. Thus, the PL display devices 9 and 8 have similar light energy utilization efficiency (for example, nearly about one-third).

Another embodiment of the first light-conversion layer 231 of the PL display device 9 is that it includes a yellow photoluminescent material, instead of red and green photoluminescent materials, to generate the converted light composed of the red spectrum light, the green spectrum light, and the blue spectrum light.

Figure 11:
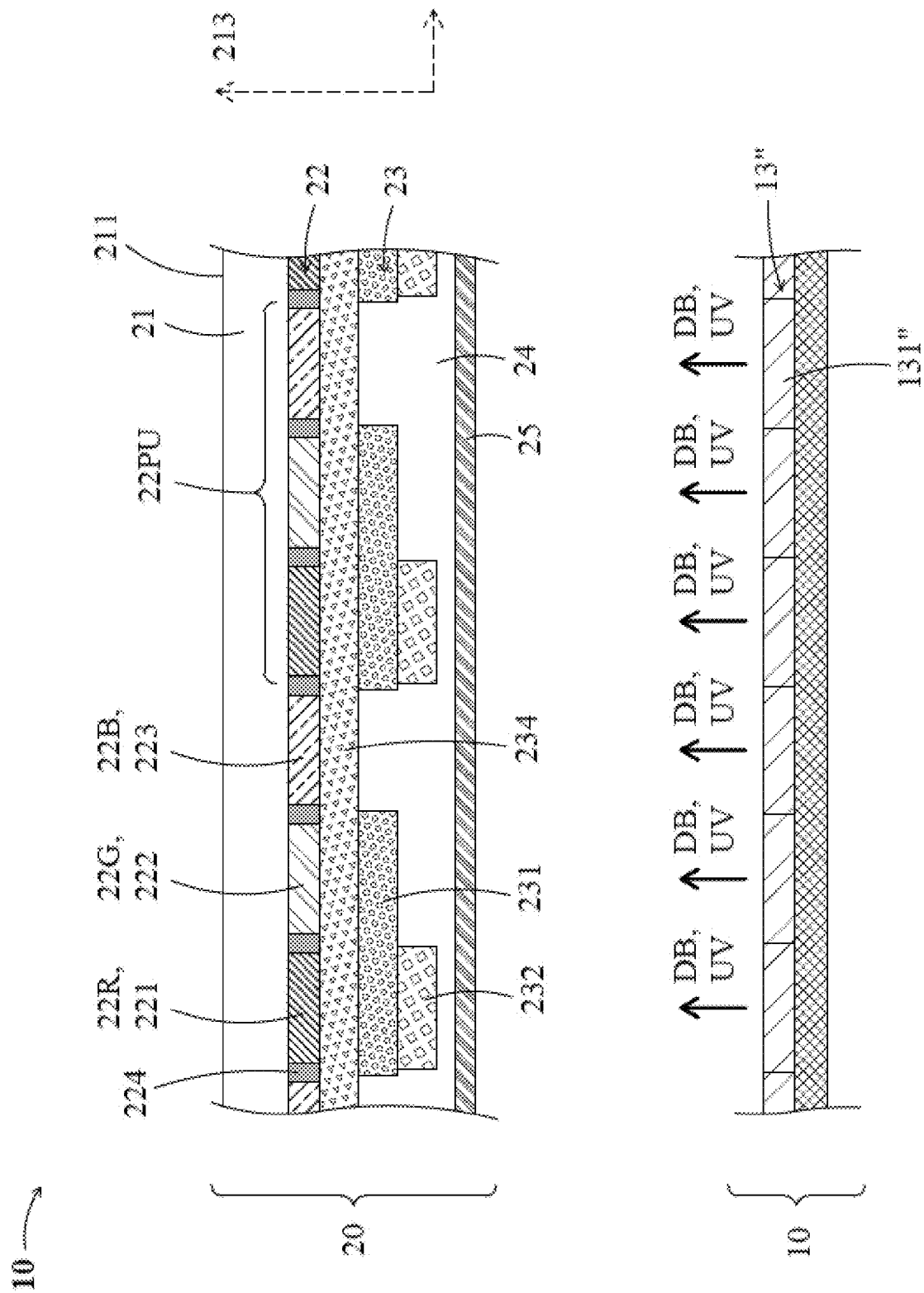
FIG. 11 is a schematic drawing in a cross-sectional view illustrating a photoluminescent display device according to another embodiment of the present disclosure.

FIG. 11 shows a schematic drawing in cross-sectional view of a PL display device 10 according to another embodiment of the present disclosure. A difference between the PL display device 10 and the aforementioned PL display device 2 is that the light source 10 is using an LED array module 13" irradiating a deep blue light or ultraviolet light, and the photoluminescent structure 23 further includes a third light-conversion layer 234.

Specifically, the LED module 13" comprises an array of LEDs 131", which can be electrically energized to generate deep blue light DB or ultraviolet light UV. Desirably, the peak wavelength of the light generated by the LED module 13" ranges from about 220 nm to about 440 nm; for example, about 220 nm to about 380 nm for ultraviolet light UV and about 380 nm to about 440 nm for deep blue light DB. Moreover, the photoluminescent structure 23 further comprises the third light-conversion layer 234, which substantially covers the entire surface of the color filter structure 22 and includes a blue photoluminescent material, such as blue phosphors, blue quantum dots and so forth, capable of converting deep 835 blue light DB or ultraviolet light UV into the blue light B. Thus, for this embodiment, the PL display device 10 has a color conversion mechanism similar to those of the aforementioned embodiments according to the present disclosure. Specifically, the deep blue light DB or the ultraviolet light UV irradiating toward the red pixel region 22R, the green pixel region 22G and the blue pixel region 22B will be converted into the red light R, the green light G and the blue light B by the second light-conversion layer 232, the first light-conversion layer 231 and the third light-conversion layer 234 respectively, and continues passing through the corresponding red, green and blue pixel regions 22R, 22G and 22B to form color images. Similarly, the PL display device 10 has the advantages of higher light energy utilization efficiency and a larger viewing angle as well.

The following paragraphs describe a manufacturing method for some embodiments of PL display devices according to the present disclosure. The manufacturing method provides a procedure to fabricate the PL display devices that are essentially the same as or similar to the PL display devices 1 to 10. It will be appreciated that some detailed descriptions of the variants of the manufacturing methods are similar and therefore omitted for the purpose of brevity.

FIG. 12A to FIG. 12D are schematic drawings illustrating the stages of the manufacturing method for the PL devices according to some embodiments of the present disclosure.

Figure 12A:
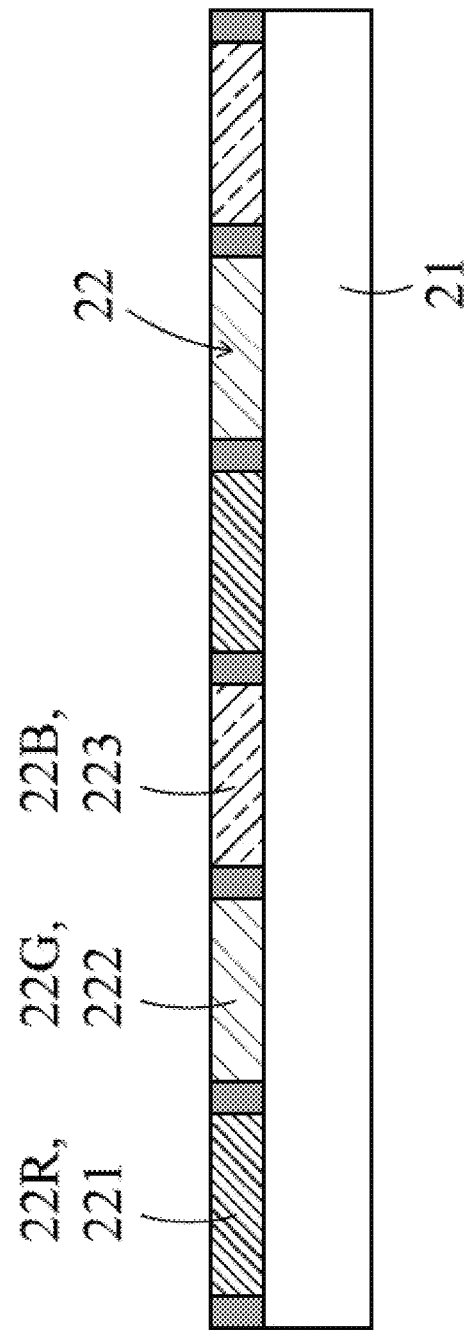
FIG. 12A, FIG. 12B, FIG. 12C, FIG. 12D, FIG. 12E, and FIG. 12F are schematic drawings illustrating a manufacturing method to fabricate a photoluminescent display device according to some embodiments of the present disclosure.
Figure 12B:
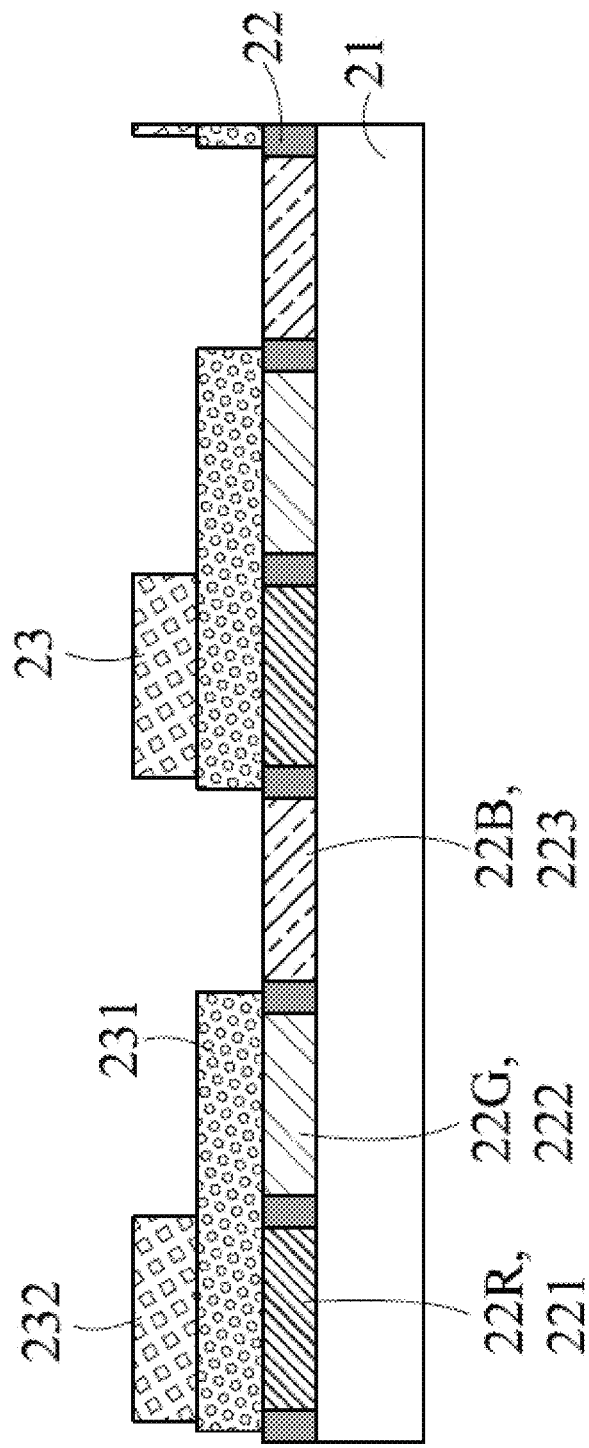
Figure 12C:
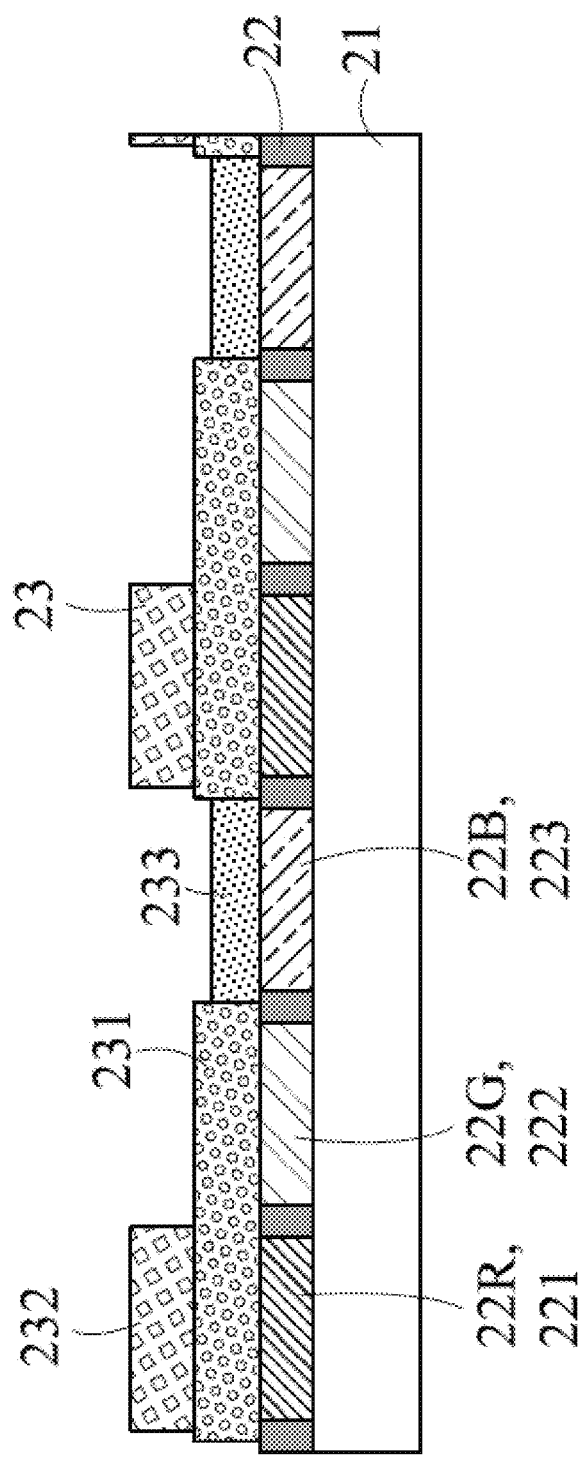
Figure 12D:
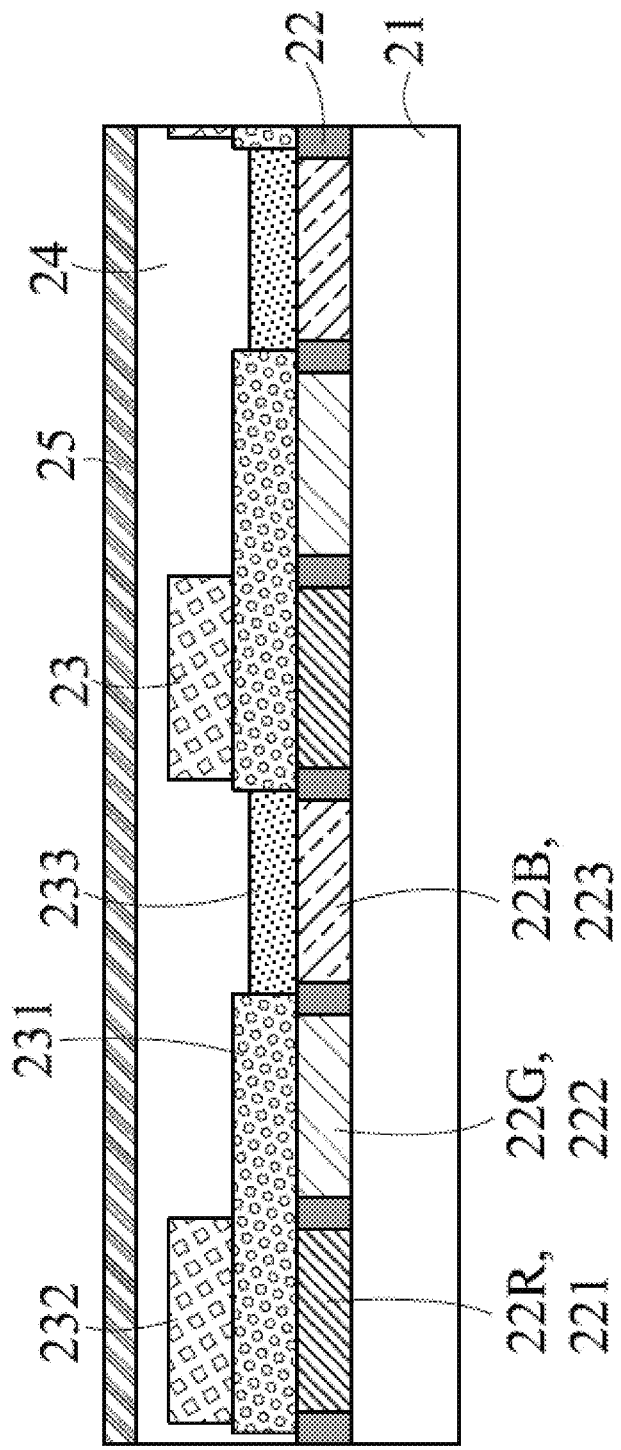

The manufacturing method includes at least two main stages: providing a blue light source 10 (referring to FIG. 2A), and forming a display panel 20 (as shown in FIG. 12D) disposed adjacent to the blue light source 10. The stage of forming the display panel 20 includes the following processes.

As shown in FIG. 12A, a transparent substrate 21 is provided first, and then a color filter structure 22 is formed on the transparent substrate 21. As for forming the color filter structure 22, a red color filter 221 is formed in a red pixel region 22R, a green color filter 222 is formed in a green pixel region 22G, and a blue color filter 223 is formed in a blue pixel region 22B. Moreover, a long-pass filter 225 (as shown in FIG. 5A) may be optionally formed on the red pixel region 22R and/or the green pixel region 22G.

As shown in FIG. 12B, a photoluminescent structure 23 is subsequently formed on the color filter structure 22. Specifically, a first light-conversion layer 231 is formed on the color filter structure 22 to cover the red pixel region 22R and the green pixel region 22G; then a second light-conversion layer 232 is formed on the first light-conversion layer 231, wherein the second light-conversion layer 232 selectively covers the red pixel region 22R.

Figure 13:
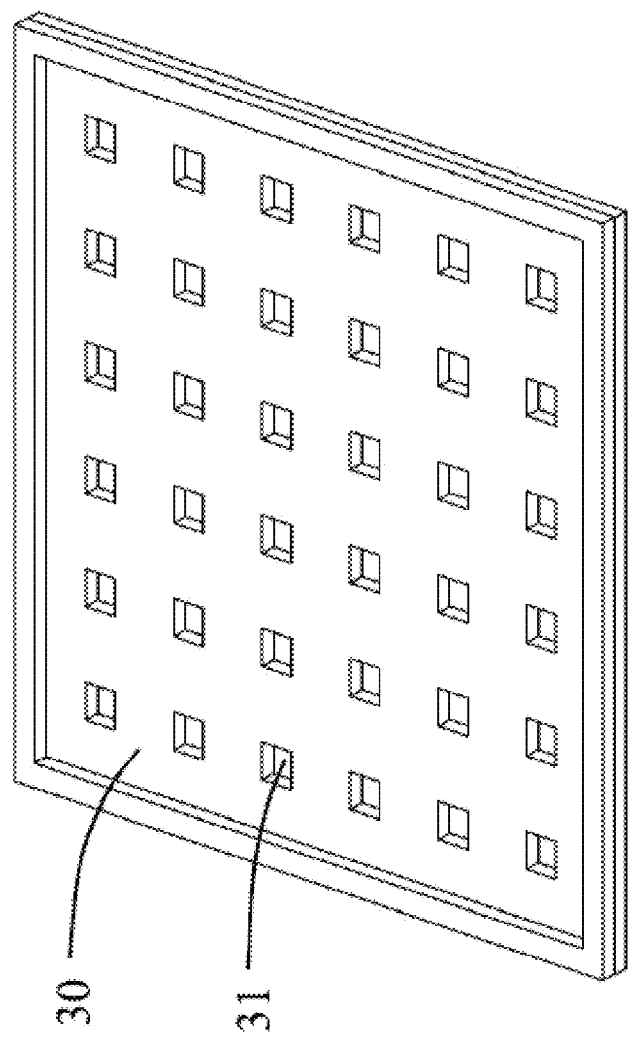
FIG. 13 is a schematic drawing of a shadow mask used to fabricate a pixelated photoluminescent structure according to one embodiment of the present disclosure.

The pixelated first light-conversion layer 231 and the pixelated second light-conversion layer 232 can be formed by using a thin-film deposition process or a spray coating process together with one or more shadow masks 30 to define the pixelated areas. As shown in FIG. 13, the shadow mask 30 includes a plurality of openings 31, and the size of the opening 31 is specified corresponding to the pixel size of the first light-conversion layer 231 or that of the second light-conversion layer 232. Specifically, the shadow mask 30 is firstly placed (with direct contact or with a gap) on the color filter structure 22, so that the opening 31 of the shadow mask 30 is aligned with the green pixel region 22G and/or the red pixel region 22R. After fully aligned, the green pixel region 22G and/or the red pixel region 22R can be observed through the opening 31 along the normal direction 213. Secondly, a green photoluminescent material and/or a polymer binder material are disposed on the green pixel region 22G and/or the red pixel region 22R defined by the opening 31. If a polymer binder material is used, the fabrication process of the pixelated first light-conversion layer 231 is completed after curing and solidifying the polymer material.

Next, another shadow mask 30 is placed (with direct contact or with a gap) on the first light-conversion layer 231 so that the opening 31 of the shadow mask 30 is aligned with the red pixel region 22R. Then, a red photoluminescent material and/or a polymer material are disposed on the red pixel region 22R defined by the opening 31. If a polymer binder material is used, the fabrication process of the pixelated second light-conversion layer 232 is completed after curing and solidifying the polymer material.

In addition to using the shadow mask 30 to define the pixel areas, the first light-conversion layer 231 and the second light-conversion layer 232 can also be formed by using a lithography process to pixelate the light-conversion layers 231 and 232. Specifically, the green photoluminescent material mixed with a photosensitive polymer material is disposed to cover the entire surface area of the red pixel region 22R, the green pixel region 22G and the blue pixel region 22B of the color filter structure 22. Then, the exposure and development processes are performed to remove the photosensitive polymer material covering the blue pixel region 22B. Thus, the pixelated first light-conversion layer 231 covering both of the red pixel region 22R and the green pixel region 22G is formed.

Next, the red photoluminescent material mixed with the photosensitive polymer material is deposited on the first light-conversion layer 231 and the blue pixel region 22B. Then, the exposure and development processes are performed to remove the photosensitive polymer material of the second light-conversion layer 232 from the blue pixel region 22B and the green pixel region 22G, wherein the photosensitive polymer of the first light-conversion layer 231 still remains covering the green pixel region 22G. Thus, the second light-conversion layer 232 is formed.

Desirably, the deposition of the aforementioned photoluminescent material and the polymer material can be achieved by the method disclosed in U.S. patent publication US2010/0119839. Using this method, the first light-conversion layer 231 and the second light-conversion layer 232 can be deposited with an uniformly distributed photoluminescent material and an uniform thickness. In addition, the method allows the material to be densely deposited to achieve a high packing density, so that the first light-conversion layer 231 and the second light-conversion layer 232 can have a higher concentration of the photoluminescent material. The technical contents of the U.S. patent publication are hereby incorporated by reference in its entirety.

After the first light-conversion layer 231 and the second light-conversion layer 232 are formed, as shown in FIG. 12C, light scattering particles mixed with another polymer material can be deposited on the blue pixel region 22B by spray coating, printing or dispensing to form the light-transmitting layer 233 of the photoluminescent structure 23. The light scattering particles mixed inside the polymer material can also be deposited on the blue pixel region 22B by spray coating or printing in conjunction with shadow masking. The polymer material can also be diluted using an organic solvent (such as octane, xylene, acetate, ether, toluene and so forth) to have a lower viscosity. If spray coating is used to prepare the light-transmitting layer 233, the diluted material will readily flow to the lower blue pixel region 22B due to the gravity effect. After curing, the light-transmitting layer 233 is formed. In this procedure, the shadow masking process and the associated alignment stages can be omitted, which greatly streamlines the manufacturing process. Moreover, since the light scattering particles do not change the wavelength of the light, if a small residue amount of the light scattering material is left covering the top surface(s) of the first light-conversion layer 231 and/or the second light-conversion layer 232, the main functions of the first light-conversion layer 231 and the second light-conversion layer 232 will not be significantly impacted.

As shown in FIG. 12D, after the photoluminescent structure 23 is formed, a planarization layer 24 and/or a short-pass filter 25 may be optionally formed on the photoluminescent structure 23. Finally, the blue light source 10 adjoins the display panel 20 to form a photoluminescent display device.

Similar to the aforementioned processing stages, the PL display devices 1 to 3 according to the present disclosure can be fabricated.

Furthermore, after forming the color filter structure 22, the reflective structure 26 as shown in FIG. 5A can be formed on the color filter structure 22. Then, the photoluminescent structure 23 is subsequently formed among sidewalls of the reflective structure 26. Therefore, the devices similar to the PL display devices 4 and 5 according to the present disclosure can be fabricated.

Figure 12E:
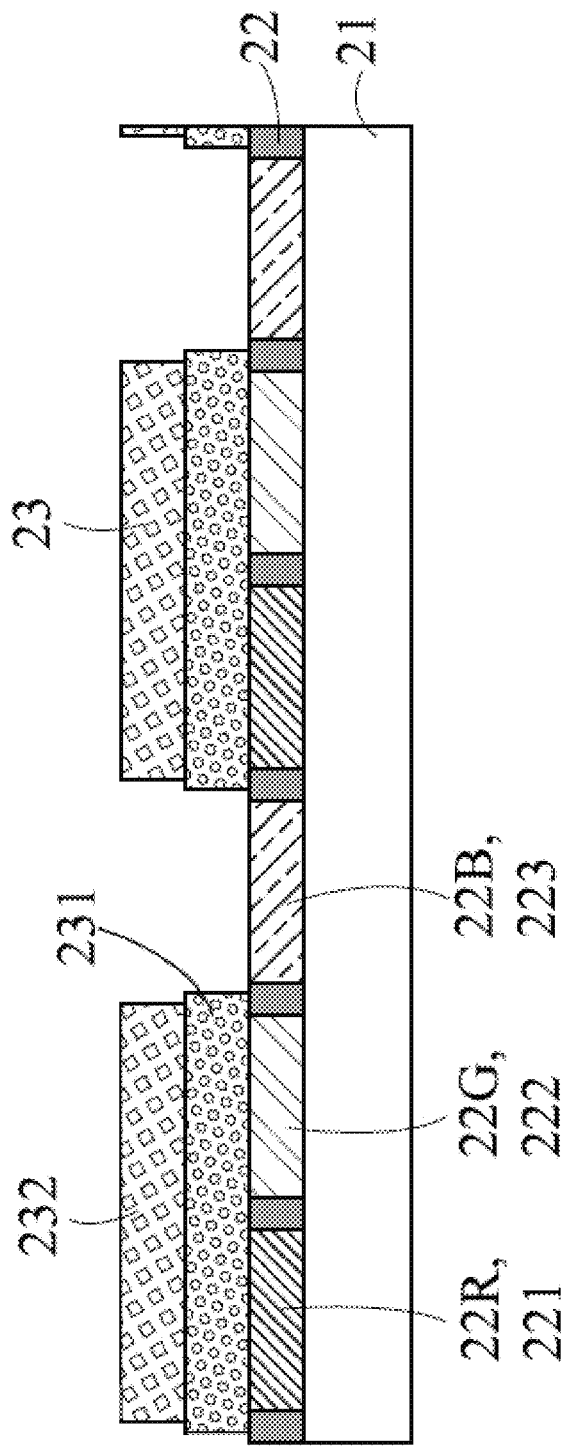

Additionally, as shown in FIG. 12E, during the fabrication process of forming the photoluminescent structure 23, the second light-conversion layer 232 can be specified to cover both of the red pixel region 22R and the green pixel region 22G. Another procedure to fabricate the photoluminescent structure 23 is that, instead of forming the second light-conversion layer 232, the red photoluminescent material and green photoluminescent material are mixed together, or a yellow photoluminescent material is used, to form the first light-conversion layer 231. Therefore, the PL display devices 6 and 7 according to the present disclosure can be manufactured.

Figure 12F:
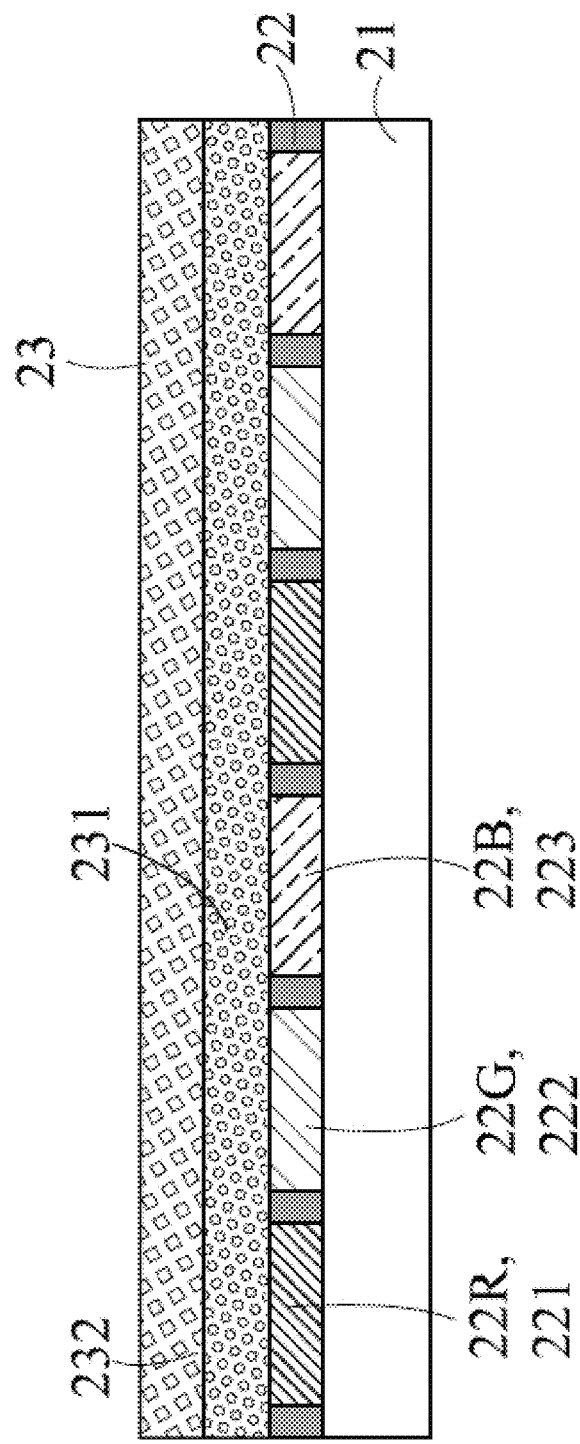

Moreover, as shown in FIG. 12F, during the fabrication process of forming the photoluminescent structure 23, the first light-conversion layer 231 and the second light-conversion layer 232 can be specified to cover substantially all of the red pixel region 22R, the green pixel region 22G and the blue pixel region 22B. Another procedure to fabricate the photoluminescent structure 23 is that the red photoluminescent material and the green photoluminescent material are mixed together, or a yellow photoluminescent material is used, to form the first light-conversion layer 231. Therefore, the PL display devices 8 and 9 according to the present disclosure can be fabricated.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, or process to the objective, spirit and scope of the disclosure. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations are not limitations of the disclosure.

What is claimed is:

1. A photoluminescent display device comprising:
   a light source; and
   a photoluminescent display panel adjacent to the light source and comprising a transparent substrate, a pixel unit, and a photoluminescent structure;
wherein:
   the pixel unit and the photoluminescent structure are disposed on the transparent substrate;

the pixel unit comprises a red pixel region, a green pixel region and a blue pixel region, wherein the red pixel region, the green pixel region and the blue pixel region are arranged adjacent to one another; and the photoluminescent structure, which is disposed on the pixel unit and is facing toward the light source, comprises a first light-conversion layer covering both the red pixel region and the green pixel region and exposing the blue pixel region when projected along a normal direction of the transparent substrate, and a second light-conversion layer disposed on the first light-conversion layer and covering the red pixel region and exposing the green pixel region and the blue pixel region when projected along the normal direction.

2. The photoluminescent display device according to claim 1, wherein:

the light source is configured to provide a blue light having a peak wavelength in a range from 420 nm to 480 nm, and the light source includes an organic light emitting diode array or an inorganic light emitting diode array; and the red pixel region includes a first long-pass filter, and the green pixel region includes a second long-pass filter.

3. The photoluminescent display device according to claim 1, wherein the red pixel region comprises a red color filter, and the green pixel region comprises a green color filter.

4. The photoluminescent display device according to claim 3, further comprising a long-pass filter covering either the red pixel region or the green pixel region, or both.

5. The photoluminescent display device according to claim 3, wherein the photoluminescent display panel further comprises either a short-pass filter or a planarization layer, or both, each of which is disposed on the photoluminescent structure and is facing toward the light source.

6. The photoluminescent display device according to claim 1, wherein the photoluminescent display panel further comprises a reflective structure, which is aligned along the normal direction with the red pixel region, the green pixel region and the blue pixel region.

7. The photoluminescent display device according to any one of claims 3 to 6, wherein:

the light source is configured to provide a blue light having a peak wavelength in a range from 420 nm to 480 nm, and the light source includes an organic light emitting diode array or an inorganic light emitting diode array;

the first light-conversion layer of the photoluminescent structure includes a green photoluminescent material; and the second light-conversion layer includes a red photoluminescent material, and the photoluminescent structure further includes a light-transmitting layer; wherein the light-transmitting layer is disposed adjacent to the first light-conversion layer covering the blue pixel region when projected along the normal direction.

8. The photoluminescent display device according to claim 7, wherein:

the first light-conversion layer further includes a first region covering the red pixel region of the pixel unit, and a second region disposed adjacent to the first region covering the green pixel region of the pixel unit; wherein a concentration or an amount of the green photoluminescent material included in the first region is less than a concentration or an amount of the green photoluminescent material included in the second region; and the second light-conversion layer is disposed on the first region facing toward the light source.

9. The photoluminescent display device according to claim 7, wherein:

the first light-conversion layer further includes a first region covering the red pixel region of the pixel unit, and a second region disposed adjacent to the first region covering the green pixel region of the pixel unit; wherein the green photoluminescent material is included in the second region but not included in the first region; and the second light-conversion layer is disposed on the first region facing toward the light source.

10. The photoluminescent display device according to claim 7, wherein the light-transmitting layer includes light scattering particles.

11. The photoluminescent display device according to any one of claims 3 to 6, wherein:

the blue pixel region comprises a blue color filter;

the light source is configured to provide a deep blue light having a peak wavelength in a range from 380 nm to 440 nm, or an ultraviolet light having a peak wavelength in a range from 220 nm to 380 nm, and the light source includes an organic light emitting diode array or an inorganic light emitting diode array;

the first light-conversion layer of the photoluminescent structure includes a green photoluminescent material; and the second light-conversion layer includes a red photoluminescent material, and the photoluminescent structure further includes a third light-conversion layer including a blue photoluminescent material; wherein the first light-conversion layer is disposed on the third light-conversion layer; and the third light-conversion layer is disposed on the red pixel region, the green pixel region and the blue pixel region of the pixel unit.

12. A photoluminescent display device comprising:

a light source; and a photoluminescent display panel adjacent to the light source and comprising a transparent substrate, a pixel unit, and a photoluminescent structure;

wherein:

the pixel unit and the photoluminescent structure are disposed on the transparent sub state;

the pixel unit comprises a red pixel region, a green pixel region and a blue pixel region, wherein the red pixel region, the green pixel region and the blue pixel region are arranged adjacent to one another; and the photoluminescent structure, which is disposed on the pixel unit and is facing toward the light source, comprises a first light-conversion layer covering both the red pixel region and the green pixel region when projected along a normal direction of the transparent substrate, and a second light-conversion layer disposed on the first light-conversion layer and covering both of the red pixel region and the green pixel region and exposing the blue pixel region when projected along the normal direction.

13. The photoluminescent display device according to claim 12, wherein:

the light source is configured to provide a blue light having a peak wavelength in a range from 420 nm to 480 nm, and the light source includes an organic light emitting diode array or an inorganic light emitting diode array;

the first light-conversion layer of the photoluminescent structure includes a green photoluminescent material; and the second light-conversion layer includes a red photoluminescent material, and the photoluminescent structure further includes a light-transmitting layer; wherein the light-transmitting layer is disposed adjacent to the first light-conversion layer covering the blue pixel region when projected along the normal direction.

14. The photoluminescent display device according to claim 13, wherein the light-transmitting layer includes light scattering particles.

* * * * *